United States Patent
Yoshinaga et al.

(10) Patent No.: US 11,987,448 B2
(45) Date of Patent: May 21, 2024

(54) ARTICLE TRANSPORT VEHICLE

(71) Applicant: Daifuku Co., Ltd., Osaka (JP)

(72) Inventors: Kazuharu Yoshinaga, Hinocho (JP); Takashi Akiyama, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 91 days.

(21) Appl. No.: 17/902,422

(22) Filed: Sep. 2, 2022

(65) Prior Publication Data

US 2023/0070238 A1 Mar. 9, 2023

(30) Foreign Application Priority Data

Sep. 3, 2021 (JP) .................. 2021-143926

(51) Int. Cl.
| | | |
|---|---|---|
| *B60P 1/28* | (2006.01) | |
| *B60L 50/60* | (2019.01) | |
| *B62D 63/02* | (2006.01) | |
| *B65G 17/12* | (2006.01) | |

(52) U.S. Cl.
CPC .............. *B65G 17/12* (2013.01); *B60L 50/60* (2019.02); *B60P 1/283* (2013.01); *B62D 63/02* (2013.01)

(58) Field of Classification Search
CPC ...... B65G 17/12; B65G 1/0492; B65G 1/065; B65G 47/962; B65G 1/1378; B65G 47/38; B65G 47/94; B65G 47/945; B65G 47/96; B65G 17/32; B65G 17/345; B65G 2207/18; B60L 50/60; B60P 1/283; B62D 63/02
USPC ........................................................ 198/579
See application file for complete search history.

(56) References Cited

U.S. PATENT DOCUMENTS

| | | | | |
|---|---|---|---|---|
| 5,672,039 | A * | 9/1997 | Perry .................. | B65G 47/962 414/280 |
| 6,502,687 | B1 * | 1/2003 | Ayen .................... | B65G 47/962 198/370.04 |
| D866,393 | S * | 11/2019 | Asai ................................ | D12/1 |
| 10,577,193 | B1 * | 3/2020 | Erceg ................. | B65G 47/962 |
| D883,354 | S * | 5/2020 | Jafarzadeh .................. | D15/199 |
| 11,001,443 | B1 * | 5/2021 | Skaloud ................. | B62D 63/04 |
| D966,142 | S * | 10/2022 | Okado ............................ | D12/1 |
| 2015/0239015 | A1 * | 8/2015 | Asari ..................... | B65G 47/68 209/606 |
| 2018/0232839 | A1 * | 8/2018 | Heinla ................. | G05D 1/0061 |

(Continued)

FOREIGN PATENT DOCUMENTS

JP 201140324 A 2/2011

*Primary Examiner* — Gene O Crawford
*Assistant Examiner* — Muhammad Awais
(74) *Attorney, Agent, or Firm* — The Webb Law Firm

(57) ABSTRACT

A vehicle body frame includes a first rib protruding from a bottom surface portion toward an upper side and extending along a first direction. A vehicle body cover includes a second rib protruding from a top surface portion toward a lower side and extending along a second direction. A lower frame portion of a holding member that holds a power storage body includes a first recessed groove portion recessed from a lower end surface toward the upper side and extending along the first direction. An upper frame portion of the holding member includes a second recessed groove portion recessed from an upper end surface toward the lower side and extending along the second direction. A power storage unit is sandwiched between the bottom surface portion of the vehicle body frame and the top surface portion of the vehicle body cover.

6 Claims, 19 Drawing Sheets

(56) References Cited

U.S. PATENT DOCUMENTS

2020/0276915 A1\* 9/2020 Takahashi ................ B60N 2/01
2021/0188550 A1\* 6/2021 Kim ..................... B65G 1/0464

\* cited by examiner

ARTICLE TRANSPORT VEHICLE

CROSS-REFERENCE TO RELATED APPLICATION

This application claims priority to Japanese Patent Application No. 2021-143926 filed Sep. 3, 2021, the disclosure of which is hereby incorporated by reference in its entirety.

BACKGROUND OF THE INVENTION

1. Field of the Invention

The present invention relates to an article transport vehicle that transports an article.

2. Description of the Related Art

Unmanned article transport vehicles that transport articles by traveling autonomously are used in physical distribution facilities and the like. In order to supply power to a wheel drive source (e.g., a motor) that drives wheels, a power storage body such as a storage battery or a capacitor is mounted on such an article transport vehicle. When the power storage body vibrates due to vibration generated through travel of the article transport vehicle, a mechanical load is applied to a connecting portion connecting the power storage body and a motor or a circuit, and therefore, it is preferable that the power storage body is appropriately fixed in the article transport vehicle. On the other hand, such a power storage body is gradually degraded as a result of being repeatedly charged and discharged and its power storage performance is reduced, and accordingly, the power storage body is replaced periodically. Therefore, the power storage body is required to be easily replaceable. That is, it is desirable that the power storage body is mounted on the article transport vehicle in such a manner as to be appropriately fixed and easily replaceable.

JP 2011-40324A discloses a container (1) for housing a lithium ion battery, which is one of power storage bodies (C) (the reference sings shown in parentheses in the description of related art are the reference signs used in the cited document). The container (1) includes a main body (10A) including a groove for holding a flat plate-shaped power storage body and a cover (10B) including a similar groove. A lower end portion of the power storage body (C) is inserted into the groove of the main body (10A), and the main body (10A) and the cover (10B) are brought into contact with each other while an upper end portion of the power storage body (C) is inserted into the groove of the cover (10B), and thus the power storage body (C) is fixed and housed in the container (1). When the cover (10B) is removed, the upper end portion of the power storage body (C) is exposed, and therefore, the power storage body (C) can be easily taken out from the container (1).

SUMMARY OF THE INVENTION

The container described above is for carrying the power storage body, and is not for fixing the power storage body in an environment in which the power storage body is used. Therefore, there is still room for improvement in realizing a structure that makes it possible to appropriately hold a power storage body in an environment in which the power storage body is used in an article transport vehicle and to easily replace the power storage body.

In view of the above circumstances, there is demand for a structure that makes it possible to appropriately hold a power storage body in an article transport vehicle and to easily replace the power storage body.

An article transport vehicle configured in view of the foregoing is configured to transport an article and includes: a vehicle body frame, a wheel supported in such a manner as to be rotatable relative to the vehicle body frame; a wheel drive source configured to drive the wheel; a power storage unit including a power storage body configured to supply power to the wheel drive source and a holding member configured to hold the power storage body; and a vehicle body cover attached to the vehicle body frame and covering the wheel drive source and the power storage unit, wherein the vehicle body frame includes: a bottom surface portion on which the power storage unit is placed; and a first rib protruding from the bottom surface portion toward an upper side and extending along a first direction when viewed in an up-down direction, the vehicle body cover includes: a top surface portion covering the power storage unit from the upper side; and a second rib protruding from the top surface portion toward a lower side and extending along a second direction that intersects the first direction when viewed in the up-down direction, the holding member includes: a lower frame portion covering a lower surface of the power storage body; an upper frame portion covering an upper surface of the power storage body; and a joint portion joining the upper frame portion and the lower frame portion, the lower frame portion includes a first recessed groove portion recessed from a lower end surface of the lower frame portion toward the upper side and extending along the first direction when viewed in the up-down direction, the upper frame portion includes a second recessed groove portion recessed from an upper end surface of the upper frame portion toward the lower side and extending along the second direction when viewed in the up-down direction, and the power storage unit is sandwiched between the bottom surface portion of the vehicle body frame and the top surface portion of the vehicle body cover in the up-down direction while the first recessed groove portion is engaged with the first rib and the second recessed groove portion is engaged with the second rib.

According to this configuration, the first recessed groove portion and the first rib extend along the first direction, and it is possible to position the power storage unit in a direction orthogonal to the first direction by engaging the first recessed groove portion and the first rib. Also, the second recessed groove portion and the second rib extend along the second direction, and it is possible to position the power storage unit in a direction orthogonal to the second direction by engaging the second recessed groove portion and the second rib. The first direction and the second direction intersect each other, and accordingly, the power storage unit can be appropriately positioned in each direction extending along the horizontal direction and can be kept from being displaced. Furthermore, the power storage unit is sandwiched between the bottom surface portion of the vehicle body frame and the top surface portion of the vehicle body cover in the up-down direction, and therefore can be appropriately positioned in the up-down direction as well. That is, the power storage unit is positioned in the directions substantially corresponding to all axes of a three-dimensional rectangular coordinate system (the three directions do not necessarily have to be orthogonal to each other as long as the three directions intersect each other). These configurations are merely engaged with each other in the up-down direction, and accordingly, there is no need to use a fastening member such as a bolt, and the power storage unit can be positioned through a simple operation of merely disposing the power storage unit at a proper position on the vehicle body frame and attaching the vehicle body cover to the vehicle body frame. Therefore, it is possible to attach and appropriately position the power storage unit relative to the vehicle body frame and the vehicle body cover through the simple operation. That is, according to this configuration, it is possible to realize a structure that makes it possible to appropriately hold the power storage body in the article transport vehicle and to easily replace the power storage body.

Further features and advantages of the article transport vehicle will be more apparent from the following description of exemplary and non-limiting embodiments given with reference to the drawings.

DESCRIPTION OF THE INVENTION

Figure 1:
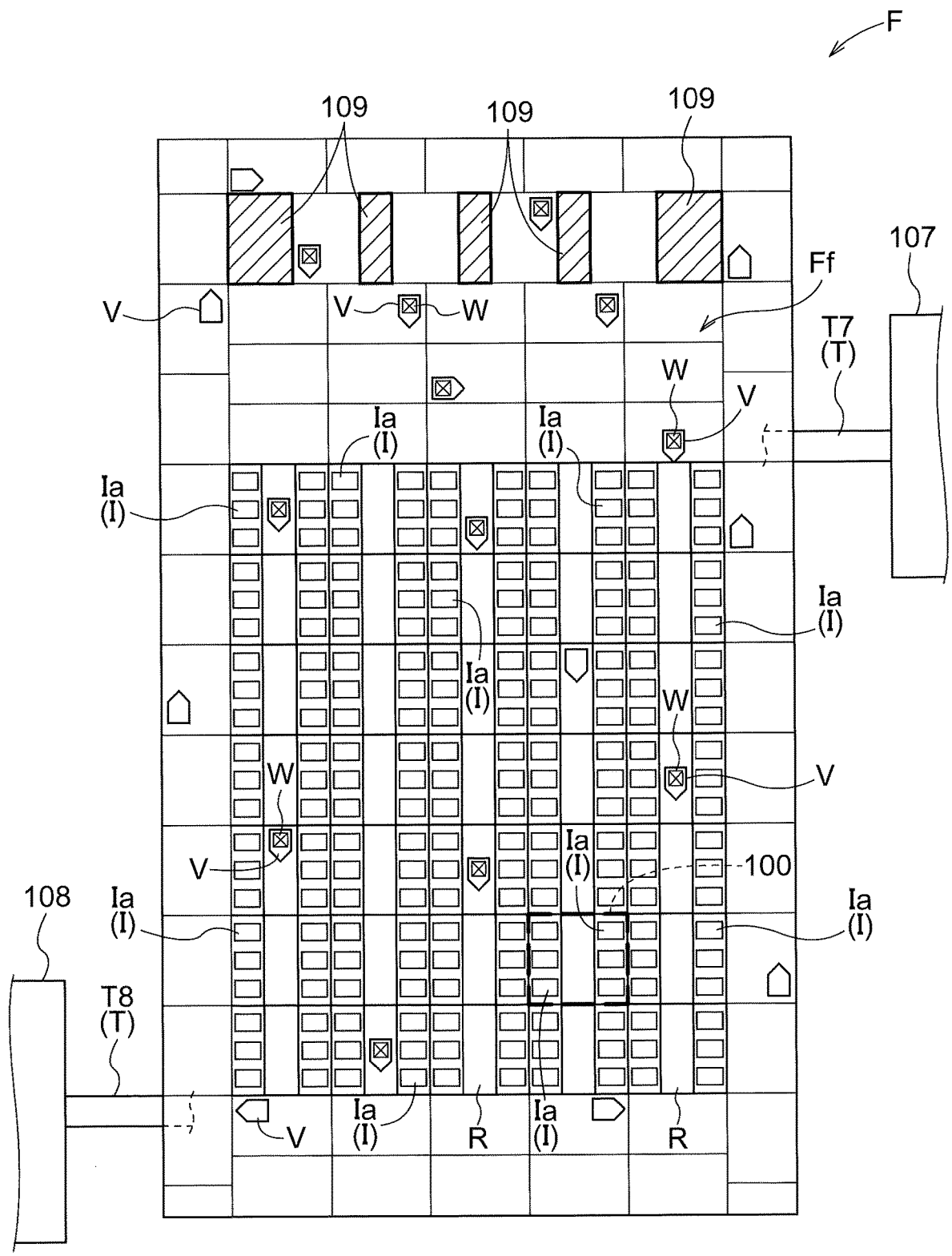
FIG. 1 is a plan view of an article transport facility including article transport vehicles.

The following describes an embodiment of an article transport vehicle in a case where the article transport vehicle is provided in an article transport facility for sorting and transporting articles. First, the following describes an overview of an article transport facility F with reference to FIGS. 1 to 5. As shown in FIG. 1, the article transport facility F includes a traveling surface Ff on which article transport vehicles V travel, article supply sections 109 for supplying transport target articles W to the article transport vehicles V, and receiving sections I for receiving articles W transported by the article transport vehicles V. The traveling surface Ff is formed as a spreading flat surface, and passages R along which the article transport vehicles V travel are set on the traveling surface Ff. The receiving sections I are provided at a plurality of positions on the traveling surface Ff. In the present embodiment, each of the receiving sections I provided at the plurality of positions includes a receiving opening Ia through which an article W is guided to a position below the traveling surface Ff.

Figure 2:
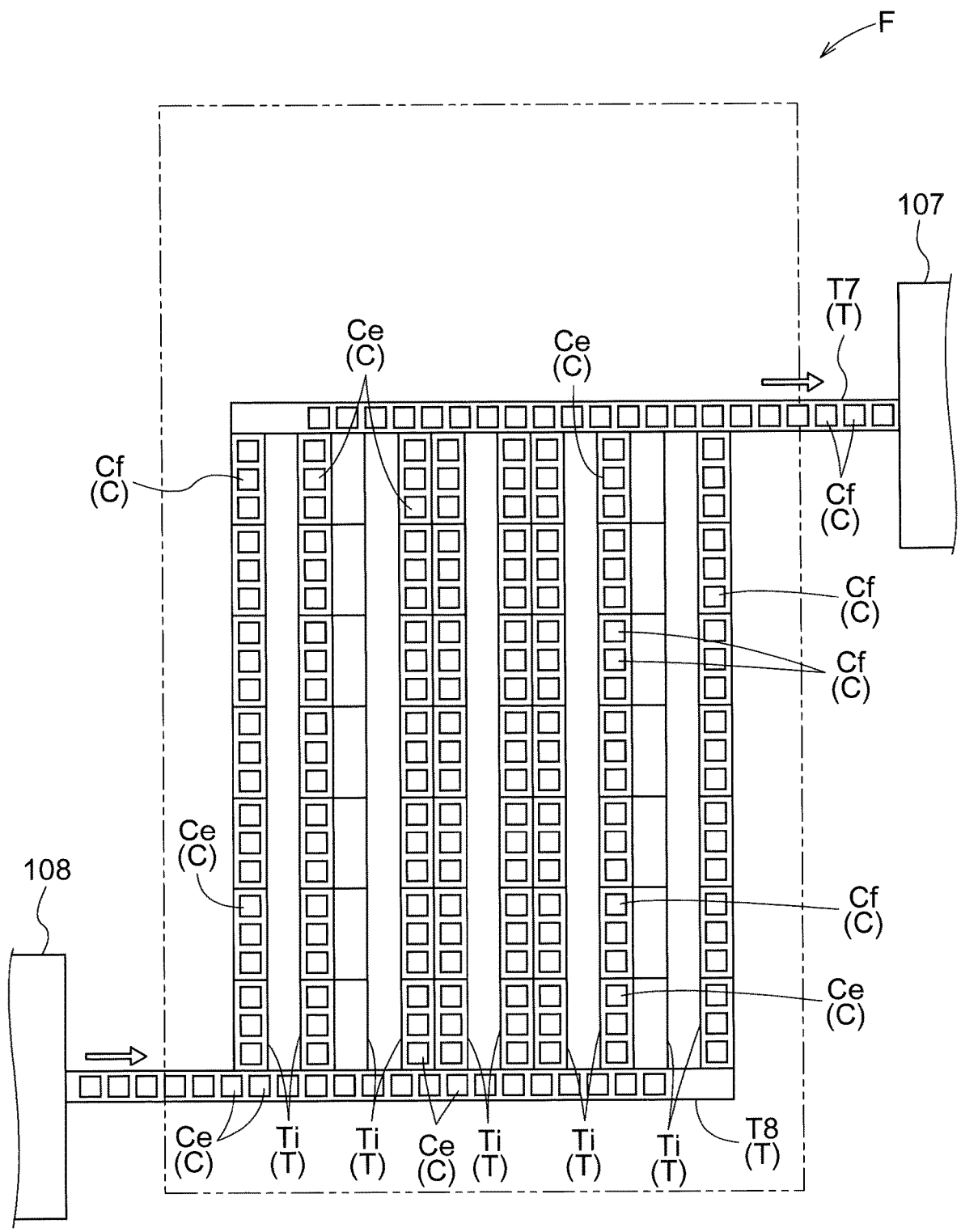
FIG. 2 is an illustrative diagram showing container transport routes.
Figure 3:
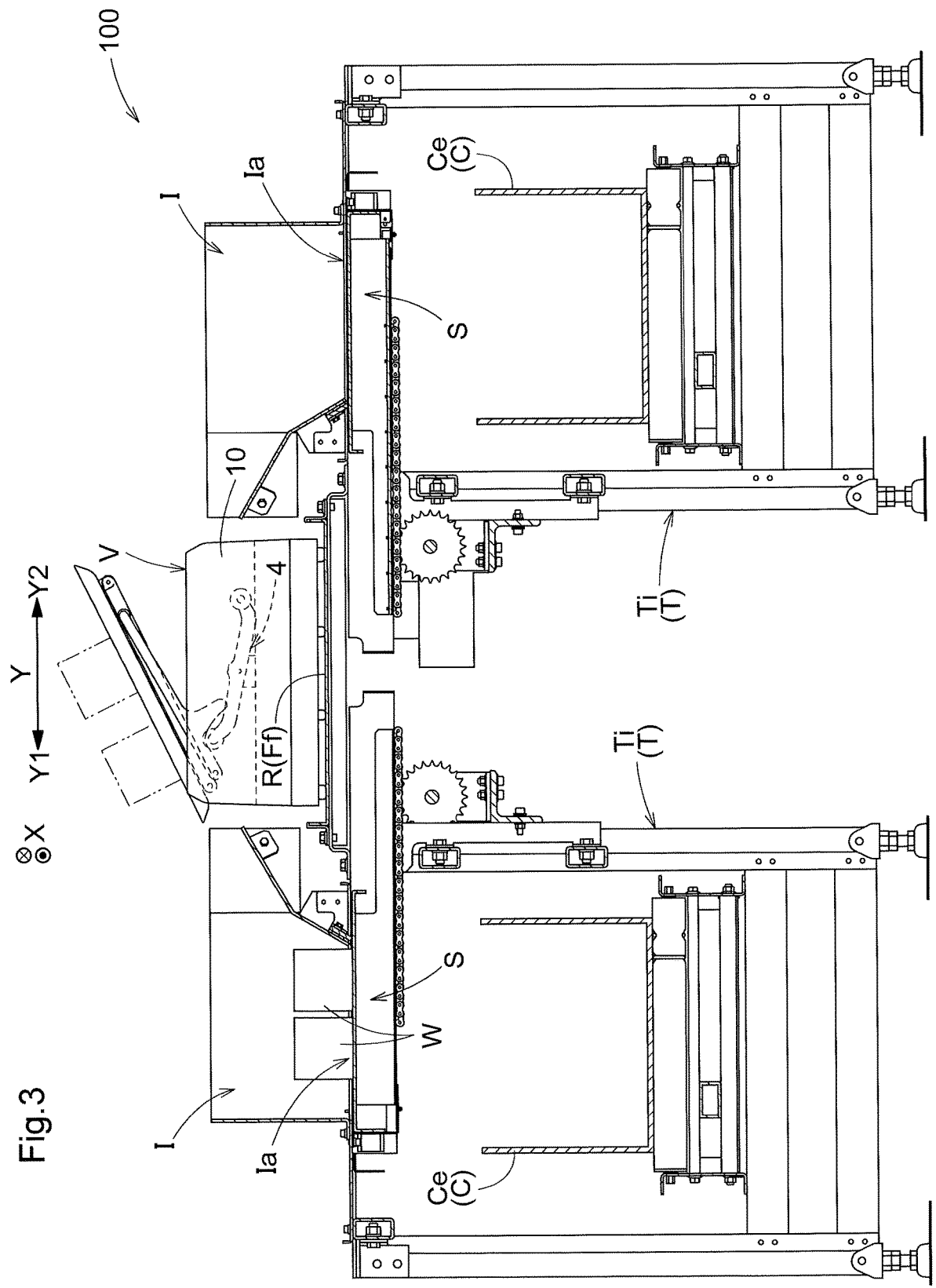
FIG. 3 is a traveling direction view showing how articles are transferred by an article transport vehicle.
Figure 4:
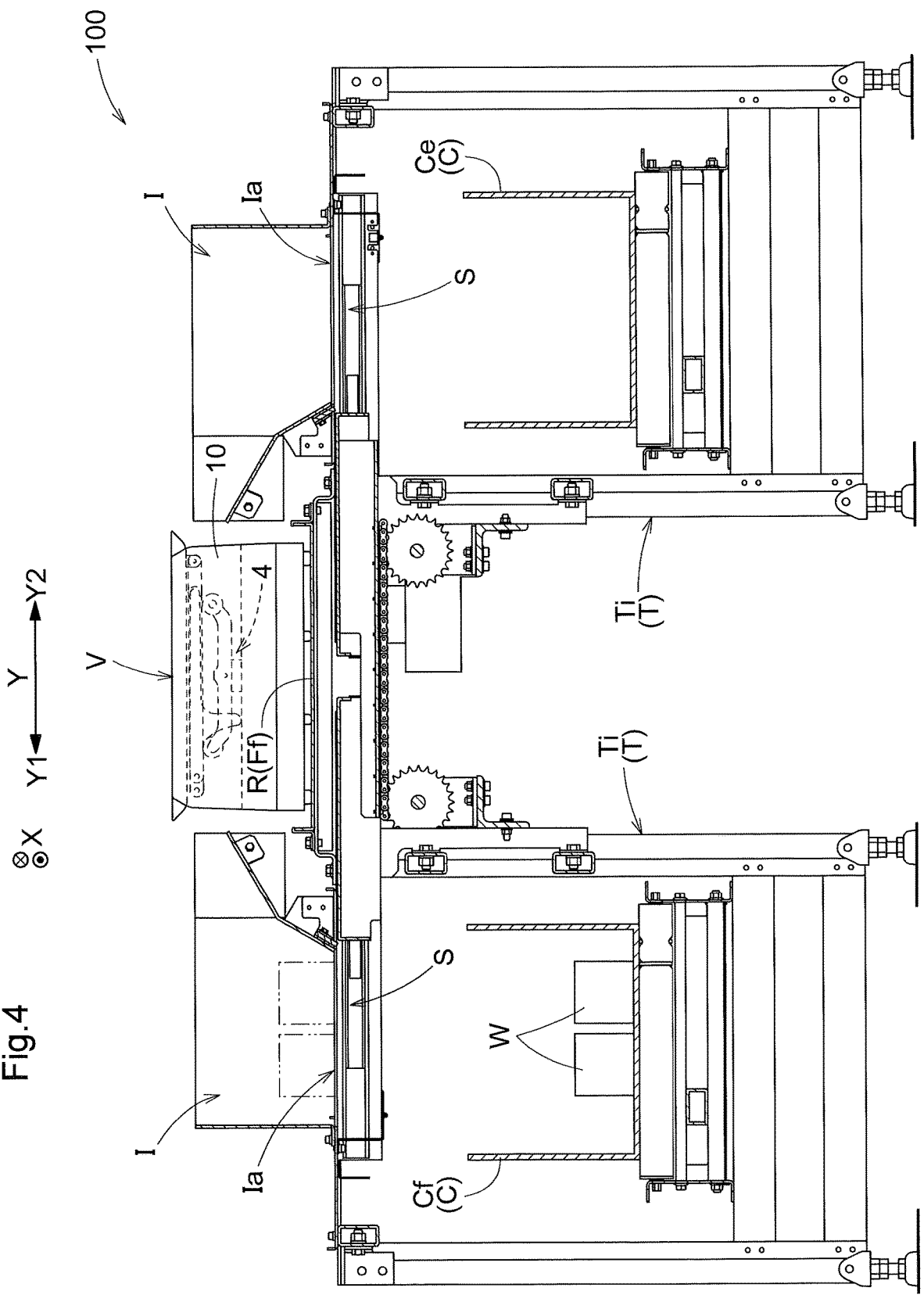
FIG. 4 is a traveling direction view showing how articles are dropped onto a conveyor unit.
Figure 5:
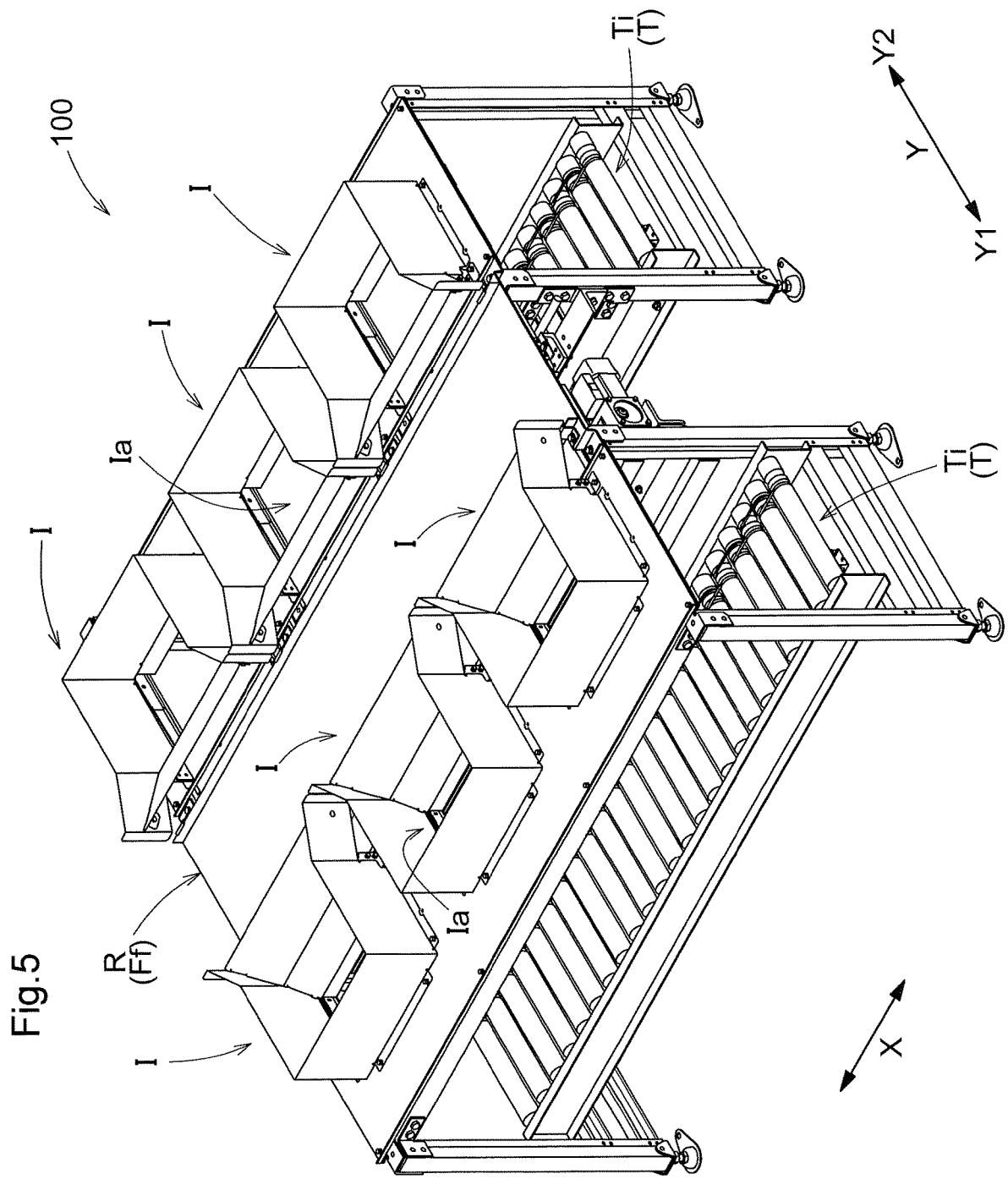
FIG. 5 is a perspective view of a frame unit.

As shown in FIG. 2, the article transport facility F includes a transport section T for transporting containers C for storing articles W, an empty container supply section 108 for supplying containers C (empty containers Ce) not storing any article W, and a shipping section 107 for shipping containers C (filled containers Cf) storing at least one article W received from the article transport vehicles V via the receiving sections I (receiving openings Ia). As shown in FIGS. 3 to 5, for example, the transport section T is arranged below the traveling surface Ff described above. In the present embodiment, the transport section T includes an empty container loading section T8 for receiving empty containers Ce supplied from the empty container supply section 108, a filled container unloading section T7 for discharging filled containers Cf storing articles W received in the receiving sections I, and receiving/transporting sections Ti provided so as to connect the empty container loading section T8 and the filled container unloading section T7. In the present embodiment, the transport section T includes a plurality of receiving/transporting sections Ti, and each of the receiving/transporting sections Ti is provided so as to connect the empty container loading section T8 and the filled container unloading section T7. In this example, the plurality of receiving/transporting sections Ti are arranged side by side in parallel in a plan view. As shown in FIG. 5, in the present embodiment, the empty container loading section T8, the filled container unloading section T7, and the receiving/transporting sections Ti are each constituted by a conveyor.

As shown in FIGS. 3 to 5, for example, the receiving sections I are arranged in such a manner as to be overlapped with the receiving/transporting sections Ti when viewed in the up-down direction. Containers C are arranged at positions corresponding to the receiving sections I in the receiving/transporting sections Ti. Accordingly, articles W received from the article transport vehicles V in the receiving sections I are guided through the receiving openings Ia to positions below the traveling surface Ff, and are then stored in containers C arranged in the receiving/transporting sections Ti (see FIGS. 3 and 4, for example). In the present embodiment, a plurality of receiving sections I are arranged side by side with each other for each of the receiving/transporting sections Ti. Also, a container C is arranged at a position corresponding to each of the receiving sections I, or more specifically at a position directly under each of the receiving sections I.

Also, in the present embodiment, the article transport facility F includes shutters S (see FIGS. 3 and 4) for opening and closing the receiving openings Ia. Each shutter S keeps the corresponding receiving opening Ia closed until the receiving section I has received at least one article W that is to be sorted based on sorting information (see FIG. 3). The shutter S then opens the receiving opening Ia after the receiving section I has received at least one article W that is to be sorted based on the sorting information (see FIG. 4). Accordingly, the articles W sorted to the receiving sections I by the article transport vehicles V pass through the receiving openings Ia and are guided to positions below the traveling surface Ff, and are stored in containers C arranged in the receiving/transporting sections Ti.

In each of the article supply sections 109, an article W for which a specified receiving section I has been designated as a transport destination based on the sorting information is supplied to an article transport vehicle V by a supply entity such as a worker or a robot, for example. The article transport vehicle V that received the article W in the article supply section 109 then travels along a passage R defined on the traveling surface Ff, and transports the article W to the receiving section I that was designated based on the sorting information.

Each of the receiving sections I is provided with a position information holder (not shown) that holds position information indicating a position corresponding to the receiving section I. An article transport vehicle V travels toward a specified receiving section I that was designated as a transport destination, and when a position information detector (not shown) detects the position information held by the position information holder that corresponds to the specified receiving section I, the article transport vehicle V stops at that position (or transitions to a low-speed traveling state) and transfers an article W to that receiving section I. The position information holder is constituted by, for example, an indicator such as a barcode (e.g., a two-dimensional barcode) that indicates position information, a storage element such as an RFID tag (radio frequency identifier tag) that stores position information, or a signal transmitter such as a beacon that emits a signal indicating position information. For example, if the position information holder is a barcode, the position information detector is configured as a barcode reader, if the position information holder is an RFID tag, the position information detector is configured as an RFID reader, and if the position information holder is a beacon, the position information detector is configured as a signal receiver.

In the present embodiment, the article transport facility F is configured by arranging a plurality of frame units 100 (see FIG. 5) side by side in a grid pattern in a plan view as shown in FIGS. 1 and 2. Each frame unit 100 includes the traveling surface Ff in which three receiving openings Ia are arranged on each of two sides of a passage R, and receiving/transporting sections Ti arranged in two rows in such a manner as to be overlapped with the traveling surface Ff (the receiving openings Ia) when viewed in the up-down direction. In FIG. 1, one of the plurality of frame units 100 is denoted by the reference sign.

Figure 21:
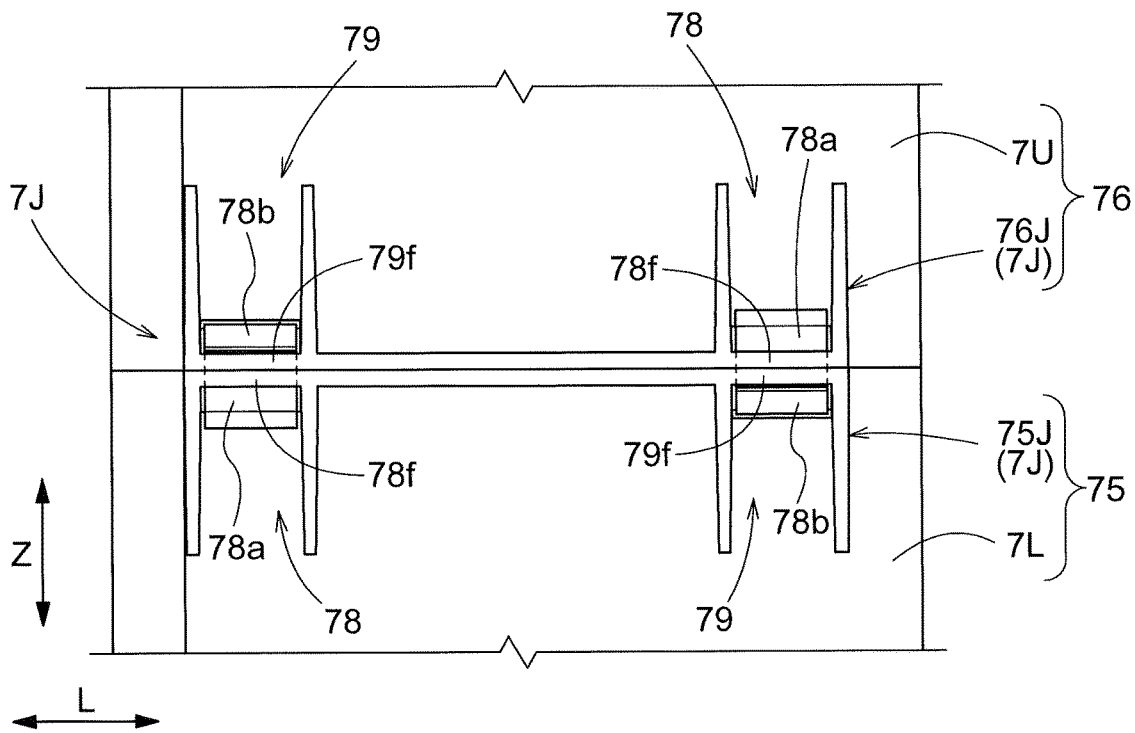
FIG. 21 is an enlarged view of a joint portion of the holding member.

In the present embodiment, as shown in FIGS. 1 and 2, 21 receiving sections I are provided for each receiving/transporting section Ti, and the empty container loading section T8 and the filled container unloading section T7 each transport 21 containers C synchronously as a container group. In this case, the receiving/transporting sections Ti each transport a group of 21 containers C after articles W have been stored in all of the 21 containers C included in that container group.

The following describes details of the article transport vehicles V with reference to FIGS. 6 to 15 as well. As shown in FIGS. 3 and 4, each article transport vehicle V travels along a passage R defined on the traveling surface Ff (see FIG. 1) with an article W placed on a placement body 3 and transports the article W from an article supply section 109 to a receiving section I. Although described in detail later, the article transport vehicle V transfers the article W from the placement body 3 to a receiving opening Ia by tilting the placement body 3 beside the receiving opening Ia.

When directions are described with reference to the article transport vehicle V, a direction extending along a first axis A1, which is a swing axis about which the placement body 3 is caused to swing to be tilted as described later, will be referred to as an axial direction L of the article transport vehicle V extending along a horizontal plane. When the article transport vehicle V travels along a traveling direction X, the axial direction L extends along the traveling direction X, and when the article transport vehicle V travels straight, the axial direction L matches the traveling direction X. Also, a direction orthogonal to the axial direction L in a plan view will be referred to as a vehicle body width direction H. In the state where the axial direction L matches the traveling direction X, the vehicle body width direction H matches a width direction Y. One side in the vehicle body width direction H will be referred to as a first side H1 in the vehicle body width direction, and the other side will be referred to as a second side H2 in the vehicle body width direction.

Figure 6:
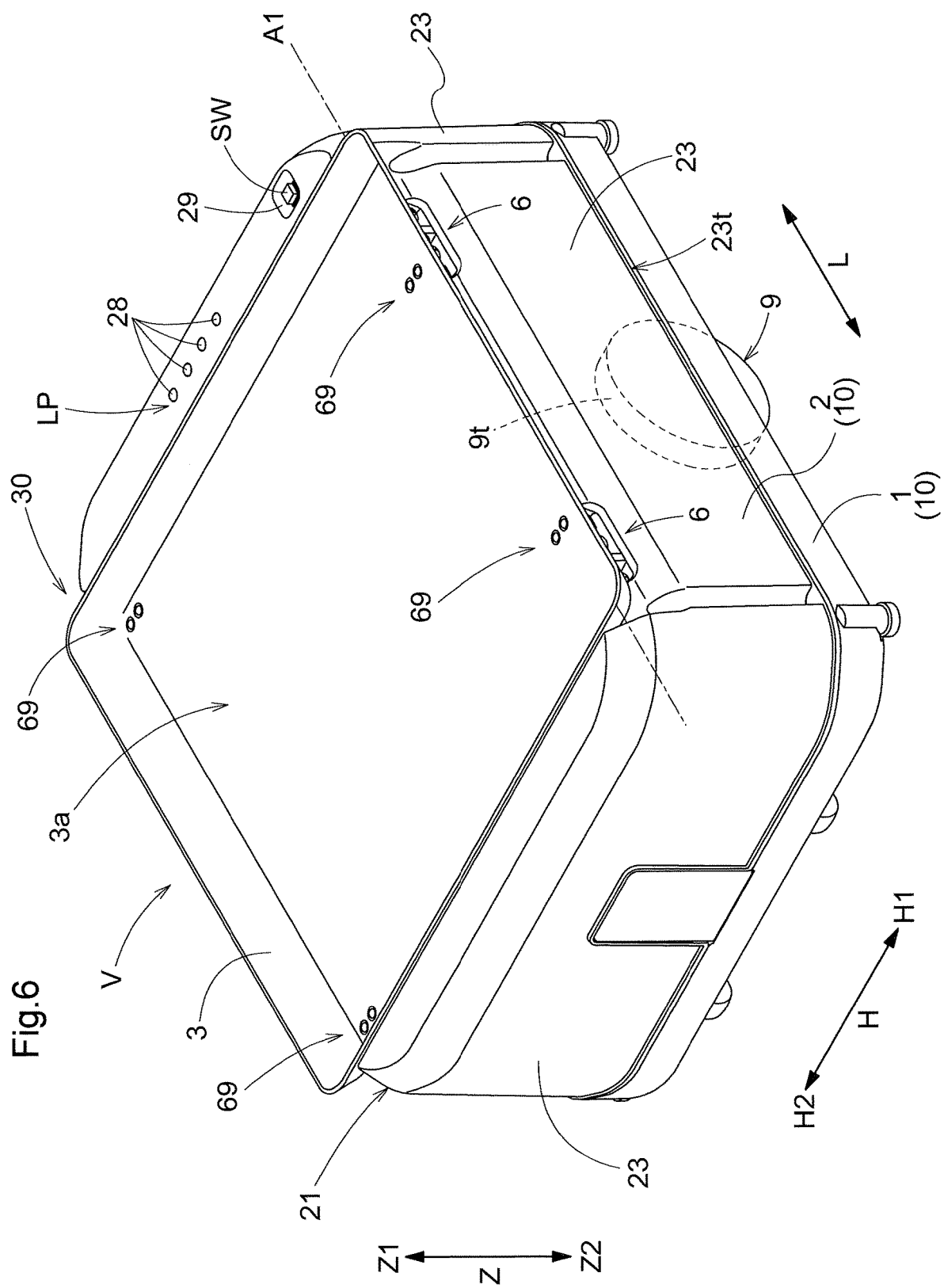
FIG. 6 is a perspective view of an article transport vehicle.
Figure 11:
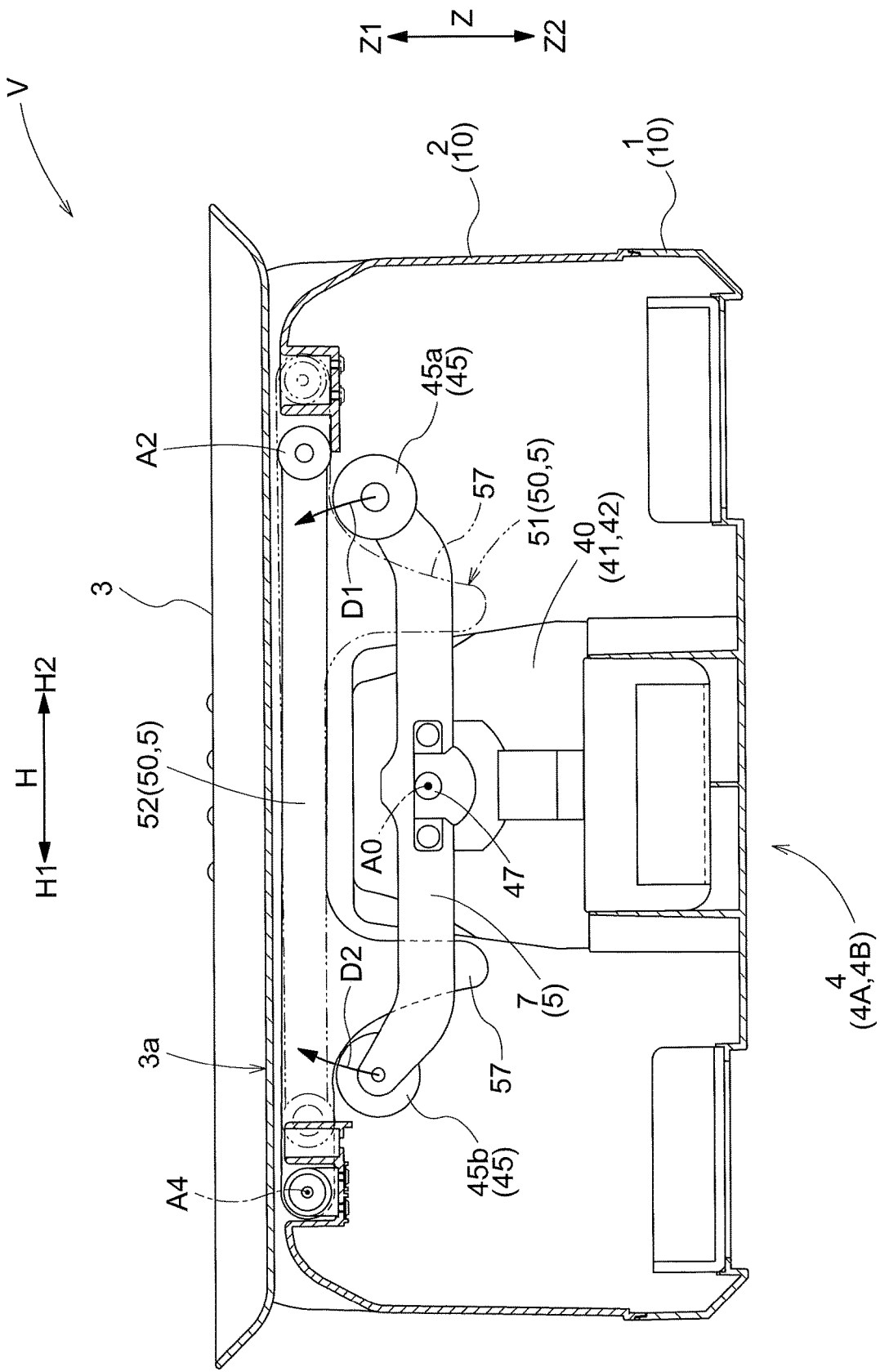
FIG. 11 is a cross-sectional view of the article transport vehicle taken along a plane orthogonal to an axis.

As shown in FIG. 6, for example, the article transport vehicle V includes a carriage body 10 that includes a vehicle body frame 1 and a vehicle body cover 2 and a transfer device 30 that is mounted on the carriage body 10, and the article transport vehicle V transports an article W. The article transport vehicle V also includes a wheel 9 (see FIGS. 6 and 7) that is supported in such a manner as to be rotatable relative to the vehicle body frame 1 and a wheel drive source 90 (see FIG. 7) that drives the wheel 9. The wheel drive source 90 is an electric motor, for example, and operates by being supplied with power from a power storage body B (see FIG. 16), such as a storage battery or a capacitor, mounted on the article transport vehicle V. As shown in FIGS. 6 and 11, for example, the transfer device 30 includes the placement body 3 that includes a placement surface 3a on which an article W is placeable, a coupling mechanism 6 that couples the placement body 3 and the carriage body 10, and a transfer drive mechanism 4 that drives the placement body 3 to transfer the article W.

In the present embodiment, the placement body 3 is shaped as a tray with an edge portion of the plate-shaped placement surface 3a protruding upward, and an article W is placed on the upper side of the placement surface 3a. The carriage body 10 includes an opposing surface 2a that faces a lower surface 3b of the placement body 3. Although described in detail later, the placement body 3 provided above the carriage body 10 is configured to swing relative to the carriage body 10 about an axis extending along the axial direction L. That is, the placement body 3 is configured to swing between a reference position at which the placement body 3 extends along the opposing surface 2a of the carriage body 10 and a standing position at which the placement body 3 is tilted relative to the opposing surface 2a. The transfer drive mechanism 4 is a mechanism for changing an angle of the placement surface 3a.

As shown in FIG. 11, the transfer device 30 includes a transfer drive source 40 that is constituted by a motor or the like. In the present embodiment, the transfer device 30 is configured to cause the placement body 3 to swing relative to the carriage body 10 about an axis (the first axis A1 or a third axis A3) extending along the axial direction L (the traveling direction X). As shown in FIG. 3, the transfer device 30 tilts the placement body 3 in the vehicle body width direction H (the width direction Y) to cause the article W to slide in the width direction Y on the placement body 3, and thus transfer the article W to a transfer location outward of the article transport vehicle V in the vehicle body width direction H (the width direction Y).

Figure 13:
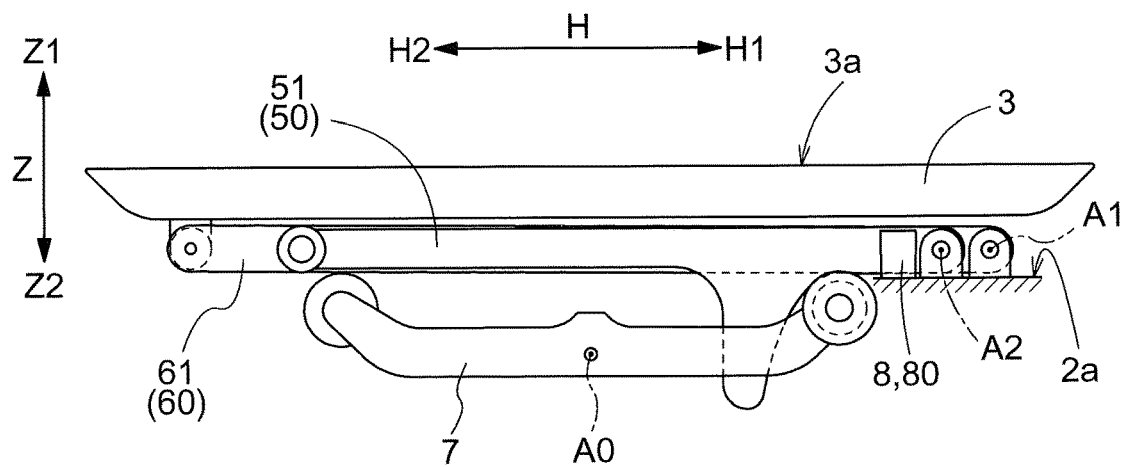
FIG. 13 is a diagram showing a relationship between the placement body in a non-tilted state and the swing arm and the support arm.
Figure 14:
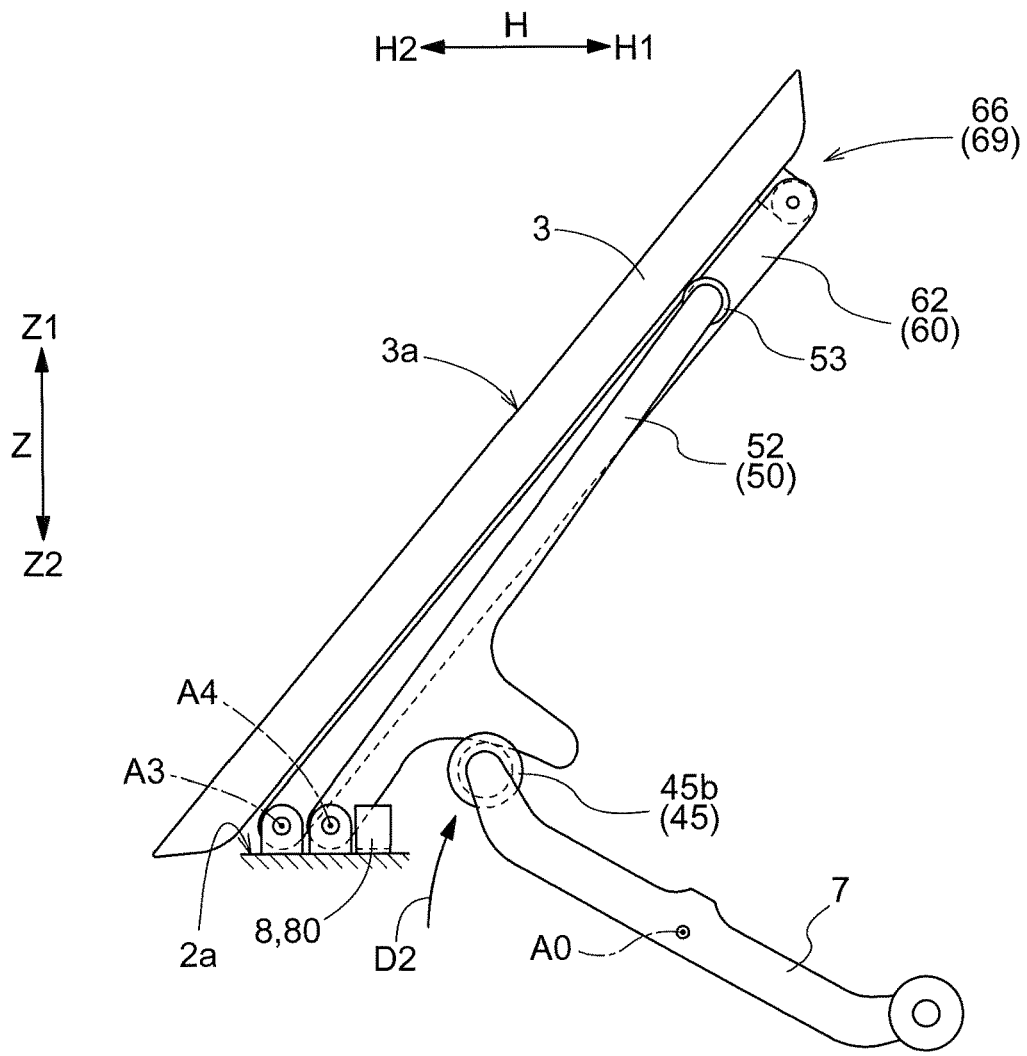
FIG. 14 is a diagram showing a relationship between the placement body in a second tilted state and a swing arm and a support arm.
Figure 15:
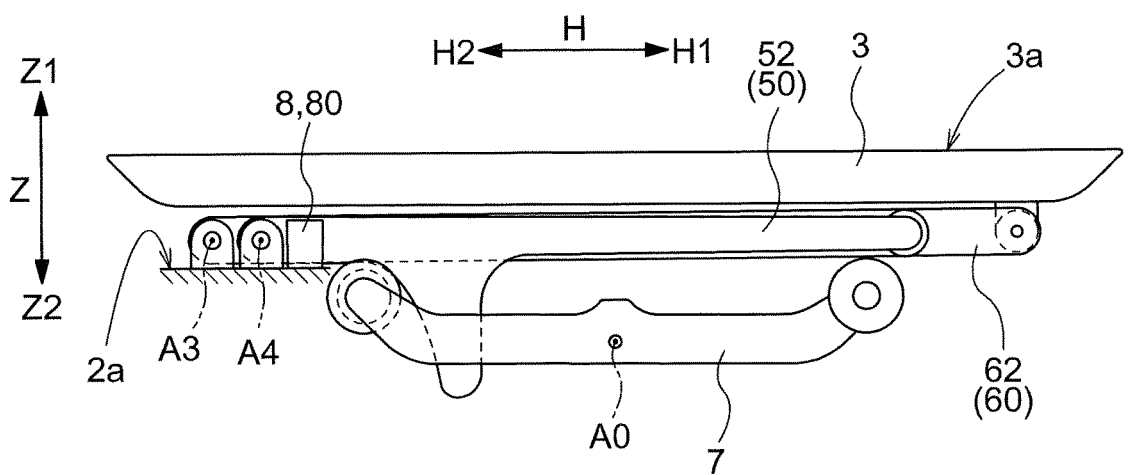
FIG. 15 is a diagram showing a relationship between the placement body in the non-tilted state and the swing arm and the support arm.

In the present embodiment, the transfer device 30 is configured to cause the placement body 3 to swing relative to the carriage body 10 about the first axis A1 (see FIGS. 12 and 13), as well as about the third axis A3 (see FIGS. 14 and 15). That is, the article transport vehicle V is capable of transferring an article W to each of receiving sections I (transfer locations) respectively arranged on the first side H1 and the second side H2 in the vehicle body width direction (a first side Y1 and a second side Y2 in the width direction) relative to the article transport vehicle V by causing the placement body 3 to swing. Note that FIG. 3 shows a state in which articles W are transferred to a receiving section I that is on the first side Y1 in the width direction (the first side H1 in the vehicle body width direction) when viewed from the article transport vehicle V.

Figure 7:
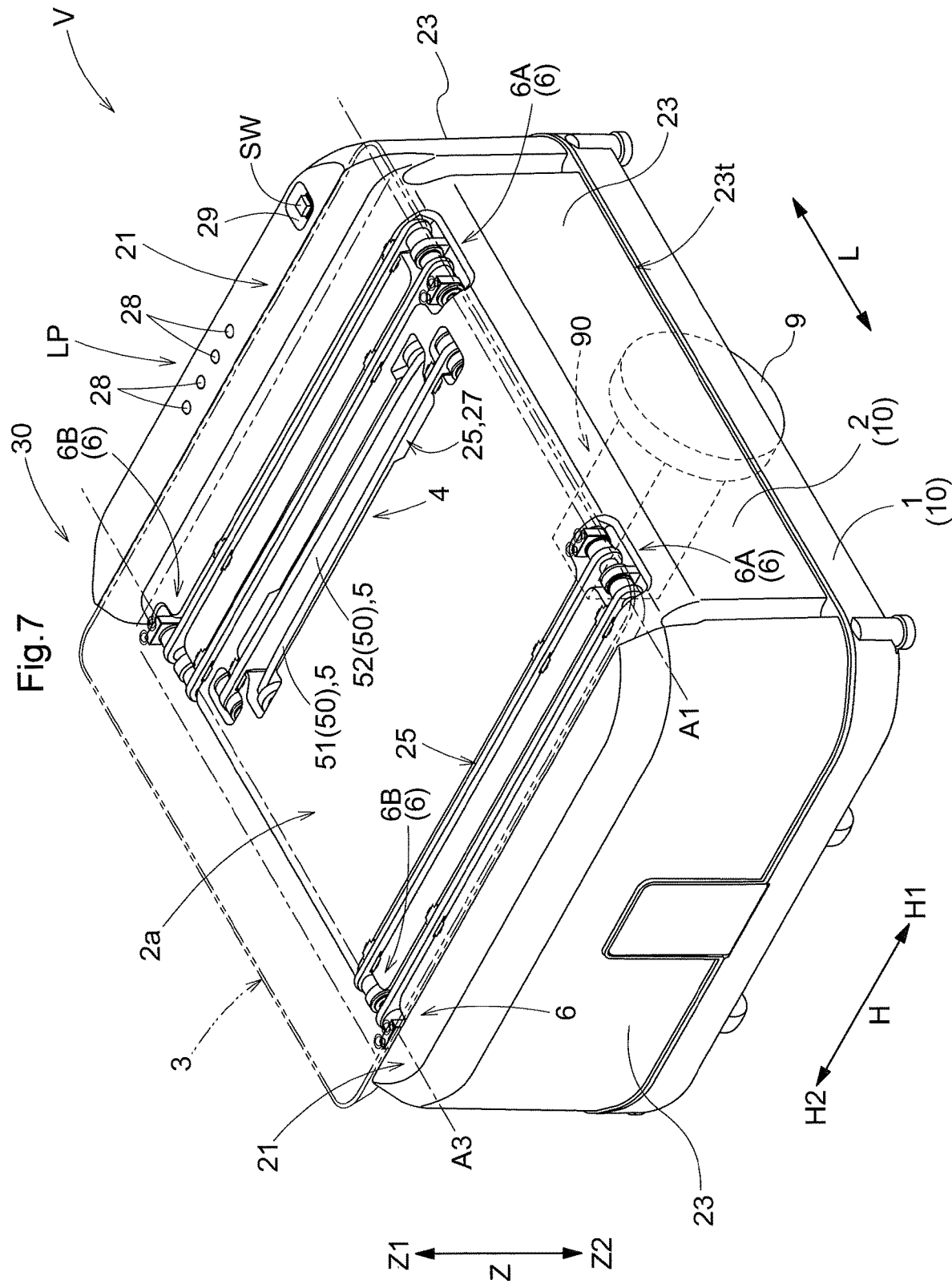
FIG. 7 is a transparent perspective view of the article transport vehicle.
Figure 8:
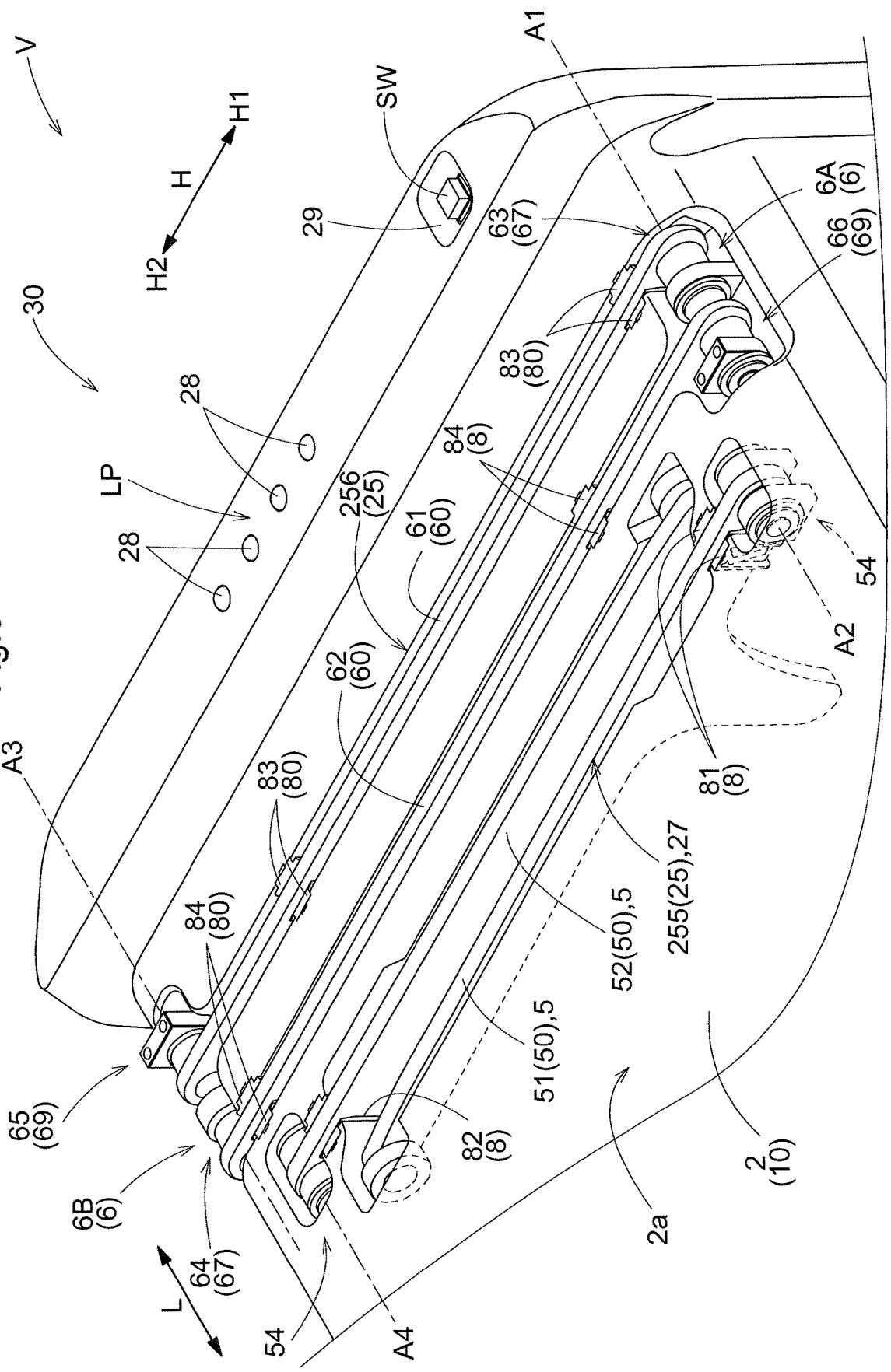
FIG. 8 is an enlarged perspective view of swing arms and support arms that are housed.

Also, in the present embodiment, a first coupling mechanism 6A and a second coupling mechanism 6B are provided as the coupling mechanism 6, and a first transfer drive mechanism 4A and a second transfer drive mechanism 4B are provided as the transfer drive mechanism 4. As shown in FIGS. 7 and 8, for example, the first coupling mechanism 6A couples the placement body 3 and the carriage body 10 in such a manner that the placement body 3 is swingable relative to the carriage body 10 about the first axis A1 extending along the horizontal plane. The first transfer drive mechanism 4A includes a first swing arm 51 (a swing arm 50) that swings about a second axis A2 parallel to the first axis A1 and a first transfer drive source 41 that causes the first swing arm 51 to swing. The second coupling mechanism 6B couples the placement body 3 and the carriage body 10 in such a manner that the placement body 3 is swingable relative to the carriage body 10 about the third axis A3 extending along the horizontal plane. The second transfer drive mechanism 4B includes a second swing arm 52 (a swing arm 50) that swings about a fourth axis A4 parallel to the third axis A3 and a second transfer drive source 42 that causes the second swing arm 52 to swing. Note that the third axis A3 is parallel to the first axis A1, and the first axis A1, the second axis A2, the third axis A3, and the fourth axis A4 are parallel to each other.

In the present embodiment, a configuration is described as an example in which the first axis A1 and the second axis A2 are separate axes, but the first axis A1 and the second axis A2 may be the same axis. Likewise, a configuration is described as an example in which the third axis A3 and the fourth axis A4 are separate axes, but the third axis A3 and the fourth axis A4 may be the same axis. Also, in the present embodiment, the common transfer drive source 40 (a motor) serves as the first transfer drive source 41 and the second transfer drive source 42 as described later. Also, an output member 7 that is coupled to an output shaft 47 of the transfer drive source 40 is common to the first transfer drive source 41 and the second transfer drive source 42. The output member 7 is also included in the transfer drive mechanism 4.

Figure 12:
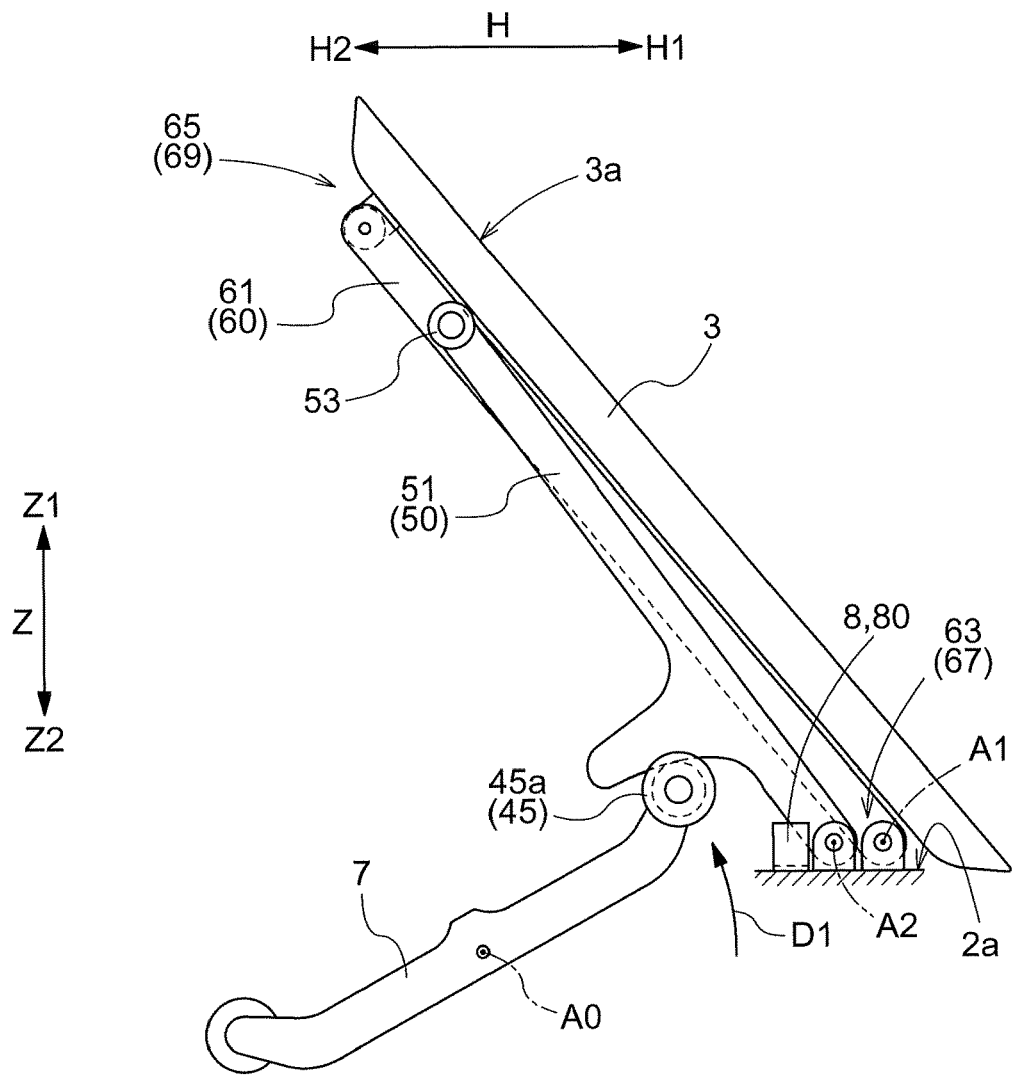
FIG. 12 is a diagram showing a relationship between the placement body in a first tilted state and a swing arm and a support arm.

Each swing arm 50 is formed in such a manner as to extend along the vehicle body width direction H and swings between a reference position (see FIGS. 13 and 15) at which the swing arm 50 extends along the opposing surface 2a and a standing position (see FIGS. 12 and 14) at which the swing arm 50 is tilted relative to the opposing surface 2a. When the swing arm 50 is at the reference position, the placement body 3 is at a horizontal position at which the placement surface 3a extends along the horizontal plane as shown in FIGS. 13 and 15, for example. As shown in FIGS. 12 and 14, for example, while the swing arm 50 moves from the horizontal position to the standing position, the placement body 3 swings due to being pressed by the swing arm 50 from a lower side, and when the swing arm 50 is at the standing position, the placement body 3 is at a tilted position at which the placement surface 3a is tilted relative to the horizontal plane.

Specifically, the first swing arm 51 is formed in such a manner as to extend along a direction (the vehicle body width direction H) orthogonal to the second axis A2 and swings between the reference position (see FIGS. 7, 8, 11, and 13, for example) at which the first swing arm 51 extends along the opposing surface 2a and the standing position (see FIGS. 10 and 12, for example) at which the first swing arm 51 is tilted relative to the opposing surface 2a. When the first swing arm 51 is at the reference position, the placement body 3 is at the horizontal position (see FIGS. 6, 11, and 13, for example) at which the placement surface 3a extends along the horizontal plane. While the first swing arm 51 moves from the horizontal position to the standing position, the placement body 3 swings due to being pressed by the first swing arm 51 from the lower side Z2, and when the first swing arm 51 is at the standing position, the placement body 3 is at the tilted position (a first tilted position, see FIGS. 10 and 12) at which the placement surface 3a is tilted relative to the horizontal plane. At the first tilted position, the placement surface 3a is tilted in such a manner as to face the first side H1 in the vehicle body width direction.

Also, the second swing arm 52 is formed in such a manner as to extend along a direction (the vehicle body width direction H) orthogonal to the fourth axis A4 and swings between the reference position (see FIGS. 7, 8, 11, and 15, for example) at which the second swing arm 52 extends along the opposing surface 2a and the standing position (see FIG. 14, for example) at which the second swing arm 52 is tilted relative to the opposing surface 2a. When the second swing arm 52 is at the reference position, the placement body 3 is at the horizontal position (see FIGS. 6, 11, and 15, for example) at which the placement surface 3a extends along the horizontal plane. While the second swing arm 52 moves from the horizontal position to the standing position, the placement body 3 swings due to being pressed by the second swing arm 52 from the lower side Z2, and when the second swing arm 52 is at the standing position, the placement body 3 is at the tilted position (a second tilted position, see FIG. 14) at which the placement surface 3a is tilted relative to the horizontal plane. At the second tilted position, the placement surface 3a is tilted in such a manner as to face the second side H2 in the vehicle body width direction.

Figure 10:
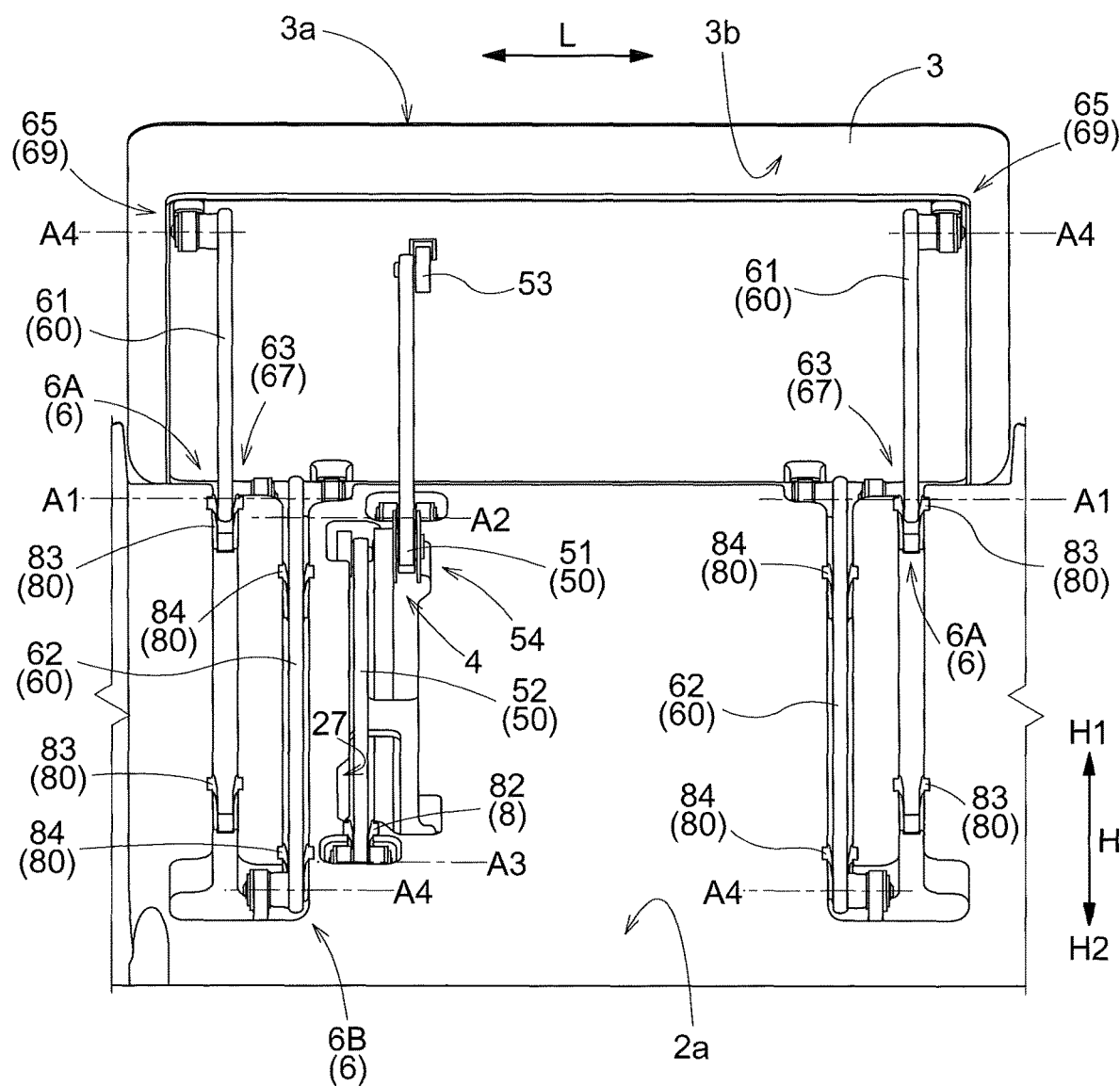
FIG. 10 is a plan view of the article transport vehicle viewed from an opening side in a state where a placement body is tilted.

In the present embodiment, as shown in FIGS. 7 and 10, for example, the swing arms 50 for tilting the placement surface 3a in respective directions are each disposed at a position in the axial direction L. That is, the single first swing arm 51 for tilting the placement surface 3a to the first tilted position is disposed at a position in the axial direction L, and the single second swing arm 52 for tilting the placement surface 3a to the second tilted position is disposed at a position in the axial direction L. Also, the first swing arm 51 and the second swing arm 52 are disposed adjacent to each other in the axial direction L.

If the placement surface 3a is tilted by a single swing arm 50, the placement surface 3a may wobble or warp, for example. Therefore, the present embodiment includes support arms 60, which will be described later, extending in parallel to the swing arms 50 to assist a positional change of the placement body 3 caused by the swing arms 50 and keep the placement body 3 (the placement surface 3a) from warping. The transfer device 30 includes the coupling mechanism 6 that couples the placement body 3 and the carriage body 10, and the support arms 60 constitute a part of the coupling mechanism 6. In the present embodiment, the first coupling mechanism 6A and the second coupling mechanism 6B are provided as the coupling mechanism 6.

As shown in FIGS. 7 and 8, for example, the first coupling mechanism 6A couples the placement body 3 and the carriage body 10 (the vehicle body cover 2) in such a manner that the placement body 3 is swingable relative to the carriage body 10 about the first axis A1 extending along the horizontal plane. The first coupling mechanism 6A includes a first support arm 61 (a support arm 60) that swings about the first axis A1 and a first fulcrum support portion 63 (a fulcrum support portion 67) that supports a swing fulcrum of the first support arm 61. The first support arm 61 is swingably coupled to the placement body 3 at a first coupling portion 65 (a coupling portion 69) that is set in an end portion of the first support arm 61 opposite to the first fulcrum support portion 63.

Specifically, the first support arm 61 is formed in such a manner as to extend along a direction (the vehicle body width direction H) orthogonal to the first axis A1 and swings between a support reference position (a first support reference position: see FIGS. 7, 8, and 13, for example) at which the first support arm 61 extends along the opposing surface 2a and a support standing position (a first support standing position: see FIGS. 10 and 12) at which the first support arm 61 is tilted relative to the opposing surface 2a. When the placement body 3 is caused to swing by the first swing arm 51, the first support arm 61 swings together with the placement body 3 to the support standing position (the first support standing position). At this time, the first support arm 61 swings relative to the vehicle body cover 2 (the carriage body 10) at the first fulcrum support portion 63 coupled to the carriage body 10. At the first coupling portion 65 coupled to the placement body 3, the first support arm 61 changes its position together with the placement body 3 without swinging.

When the placement body 3 is caused to swing by the second swing arm 52, the first support arm 61 does not swing together with the placement body 3 and remains at the support reference position (the first support reference position). That is, the first support arm 61 does not swing relative to the vehicle body cover 2 (the carriage body 10) at the first fulcrum support portion 63 coupled to the carriage body 10. On the other hand, at the first coupling portion 65 coupled to the placement body 3, the first support arm 61 swings relative to the placement body 3 because the placement body 3 swings. That is, the placement body 3 and the first support arm 61 swing relative to each other at the first coupling portion 65, and thus the first support arm 61 remains at the first support reference position.

Also, as shown in FIGS. 7 and 8, for example, the second coupling mechanism 6B couples the placement body 3 and the carriage body 10 in such a manner that the placement body 3 is swingable relative to the carriage body 10 about the third axis A3 extending along the horizontal plane. The second coupling mechanism 6B includes a second support arm 62 (a support arm 60) that swings about the third axis A3 and a second fulcrum support portion 64 (a fulcrum support portion 67) that supports a swing fulcrum of the second support arm 62. The second support arm 62 is swingably coupled to the placement body 3 at a second coupling portion 66 (a coupling portion 69) that is set in an end portion of the second support arm 62 opposite to the second fulcrum support portion 64.

Specifically, the second support arm 62 is formed in such a manner as to extend along a direction (the vehicle body width direction H) orthogonal to the third axis A3 and swings between a support reference position (a second support reference position: see FIGS. 7, 8, and 15, for example) at which the second support arm 62 extends along the opposing surface 2a and a support standing position (a second support standing position: see FIG. 14) at which the second support arm 62 is tilted relative to the opposing surface 2a. When the placement body 3 is caused to swing by the second swing arm 52, the second support arm 62 swings together with the placement body 3 to the support standing position (the second support standing position). At this time, the second support arm 62 swings relative to the vehicle body cover 2 (the carriage body 10) at the second fulcrum support portion 64 coupled to the carriage body 10. At the second coupling portion 66 coupled to the placement body 3, the second support arm 62 changes its position together with the placement body 3 without swinging.

When the placement body 3 is caused to swing by the first swing arm 51, the second support arm 62 does not swing together with the placement body 3 and remains at the support reference position (the second support reference position). That is, the second support arm 62 does not swing relative to the vehicle body cover 2 (the carriage body 10) at the second fulcrum support portion 64 coupled to the carriage body 10. On the other hand, at the second coupling portion 66 coupled to the placement body 3, the second support arm 62 swings relative to the placement body 3 because the placement body 3 swings. That is, the placement body 3 and the second support arm 62 swing relative to each other at the second coupling portion 66, and thus the second support arm 62 remains at the second support reference position.

As shown in FIG. 11, the transfer drive mechanism 4 includes the transfer drive source 40 and a transmission mechanism 5 for transmitting driving force from the transfer drive source 40 to the placement body 3. The transmission mechanism 5 includes the swing arms 50 and the output member 7 that is coupled to the transfer drive source 40. The output member 7 transmits driving force from the transfer drive source 40 to the swing arms 50, and the driving force is transmitted to the placement body 3 via the swing arms 50. The swing arms 50 constituting the transmission mechanism 5 can be said to be driven members that are driven by the output member 7.

As shown in FIG. 11, in the present embodiment, the transmission mechanism 5 includes the output member 7 that is coupled to the output shaft 47 of the transfer drive source 40 and is shaped as a lever that swings about a rotation axis (an output axis A0) of the output shaft 47. The swing arms 50 are driven by the output member 7. Pressing rollers 45 that come into contact with the swing arms 50 and cause the swing arms 50 to swing are provided in two end portions of the output member 7 in the vehicle body width direction H. Each swing arm 50 includes a cam portion 57 protruding toward the lower side Z2, and the pressing rollers 45 respectively come into contact with the cam portions 57. The swing arms 50 are not coupled to the output member 7 and are configured to operate by being pressed by the output member 7. As a result of the pressing rollers 45 pressing the swing arms 50 along the cam portions 57, the swing arms 50 swing about the output axis A0.

For example, when the output member 7 is caused to swing in a first swing direction D1 shown in FIG. 11 by the transfer drive source 40, the pressing roller 45 (a first pressing roller 45a) disposed on the second side H2 in the vehicle body width direction comes into contact with the cam portion 57 of the first swing arm 51 and presses the cam portion 57 to change the position of the first swing arm 51 from the reference position (see FIGS. 11 and 13) to the standing position (FIG. 12). Likewise, when the output member 7 is caused to swing in a second swing direction D2 shown in FIG. 11 by the transfer drive source 40, the pressing roller 45 (a second pressing roller 45b) disposed on the first side H1 in the vehicle body width direction comes into contact with the cam portion 57 of the second swing arm 52 and presses the cam portion 57 to change the position of the second swing arm 52 from the reference position (see FIGS. 11 and 15) to the standing position (FIG. 14). The placement body 3 changes its position between the horizontal position and the tilted positions in conjunction with the swing arms 50, which serve as driven members.

As described above, the present embodiment includes the support arms 60 provided in parallel to the swing arms 50 to assist a positional change of the placement body 3 caused by the swing arms 50 and keep the placement body 3 (the placement surface 3a) from warping. In the present embodiment, two support arms 60 are disposed so as to sandwich the first swing arm 51 in the axial direction L to support the placement body 3 when the position of the placement surface 3a is changed to the first tilted position by the first swing arm 51. That is, the first swing arm 51 is disposed between two first support arms 61 in the axial direction L. Likewise, two support arms 60 are disposed so as to sandwich the second swing arm 52 in the axial direction L to support the placement body 3 when the position of the placement surface 3a is changed to the second tilted position by the second swing arm 52. That is, the second swing arm 52 is disposed between two second support arms 62 in the axial direction L. As described above, two support arms 60 are provided for each swing arm 50, and therefore, it is possible to keep the placement body 3 (the placement surface 3a) from warping when the position of the placement body 3 is changed by the swing arm 50.

Figure 9:
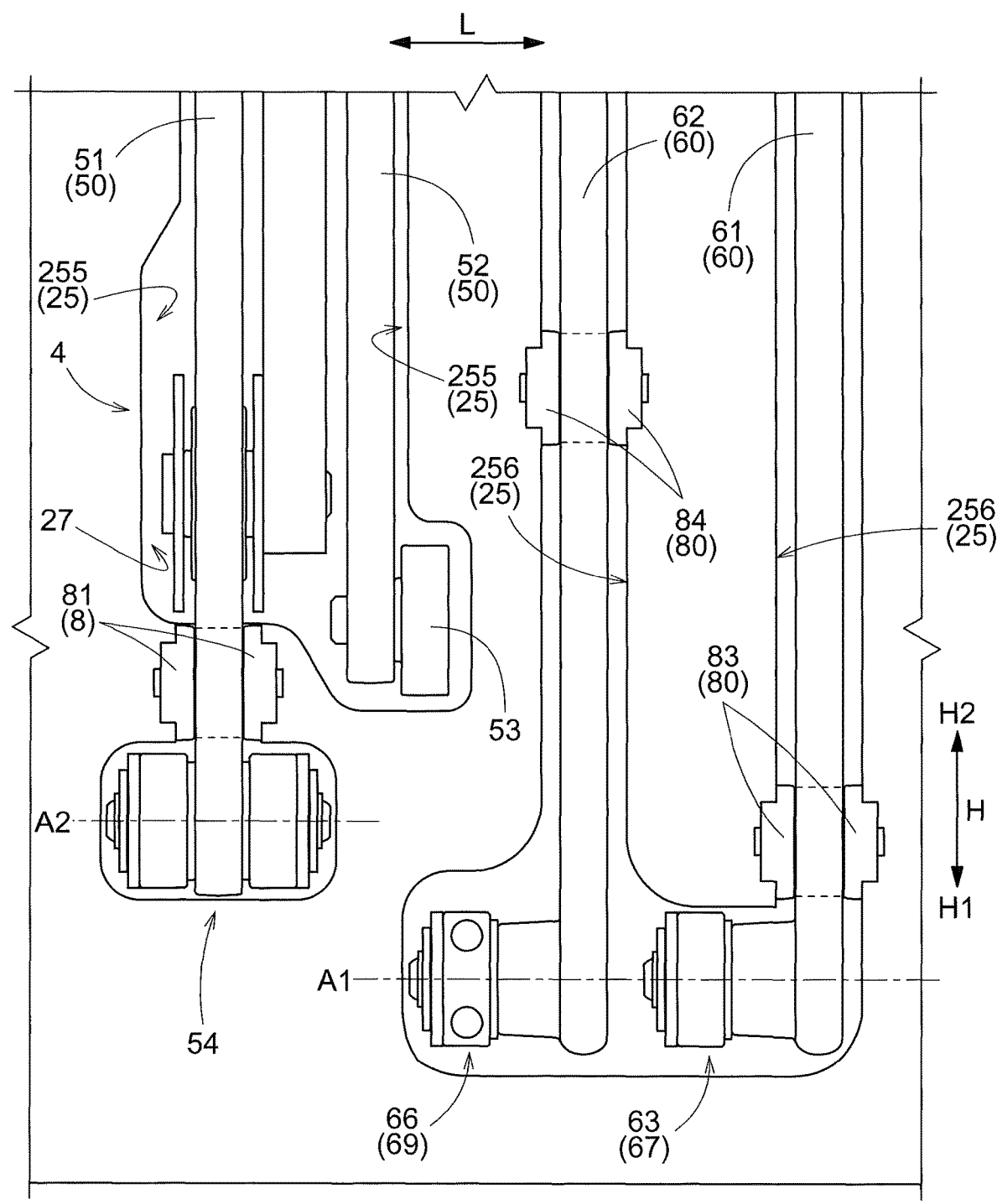
FIG. 9 is an enlarged plan view of the swing arms and the support arms that are housed.

As shown in FIGS. 8 and 9, recessed groove portions 25 for housing the swing arms 50 and the support arms 60 are formed in the opposing surface 2a of the vehicle body cover 2. When a recessed groove portion 25 for housing the swing arms 50 and a recessed groove portion 25 for housing the support arms 60 are distinguished from each other, the recessed groove portion 25 for housing the swing arms 50 will be referred to as a swing arm housing groove 255, and the recessed groove portion 25 for housing the support arms 60 will be referred to as a support arm housing groove 256.

Each swing arm 50 is swingably supported by the vehicle body cover 2 (the carriage body 10) at a swing support portion 54 on one end side in the vehicle body width direction H. The other end of the swing arm 50 is a free end that is provided with a contact roller 53. The contact roller 53 moves in the vehicle body width direction H while being in contact with the lower surface 3b of the placement body 3, and thus changes the position of the placement surface 3a of the placement body 3 from the horizontal position to the tilted position. Also, the swing arm 50 changes its position by being pressed by the output member 7 as described above. Accordingly, the swing arm housing groove 255 is open to allow the output member 7 to move past the opposing surface 2a toward the upper side Z1. That is, the swing arm housing groove 255 is formed as an opening 27, and it can be said that the vehicle body cover 2 includes the opening 27 through which the output member 7 passes in the up-down direction Z.

One end of each support arm 60 in the vehicle body width direction H is swingably supported by the vehicle body cover 2, and the other end of the support arm 60 in the vehicle body width direction H is swingably supported by the lower surface 3b of the placement body 3. In other words, the placement body 3 is attached to the vehicle body cover 2 via the support arm 60 in such a manner as to be swingable relative to the vehicle body cover 2. Unlike the swing arm housing groove 255, the support arm housing groove 256 is shaped as a groove and does not extend through the vehicle body cover 2 in the up-down direction Z.

As described above, the placement body 3, the swing arms 50 (the driven members), and the support arms 60 are supported by the vehicle body cover 2. The wheel drive source 90, the transfer drive source 40, and the output member 7 are supported by the vehicle body frame 1. As shown in FIGS. 7 and 11, for example, the vehicle body cover 2 covers the wheel drive source 90 and the transfer drive source 40. As described above, the swing arms 50 driven by the output member 7 are not coupled to the output member 7 and are configured to operate by being pressed by the output member 7. Accordingly, the vehicle body cover 2 is attached to the vehicle body frame 1 in such a manner as to be attachable to and detachable from the vehicle body frame 1 while supporting the placement body 3, the swing arms 50, and the support arms 60.

Figure 16:
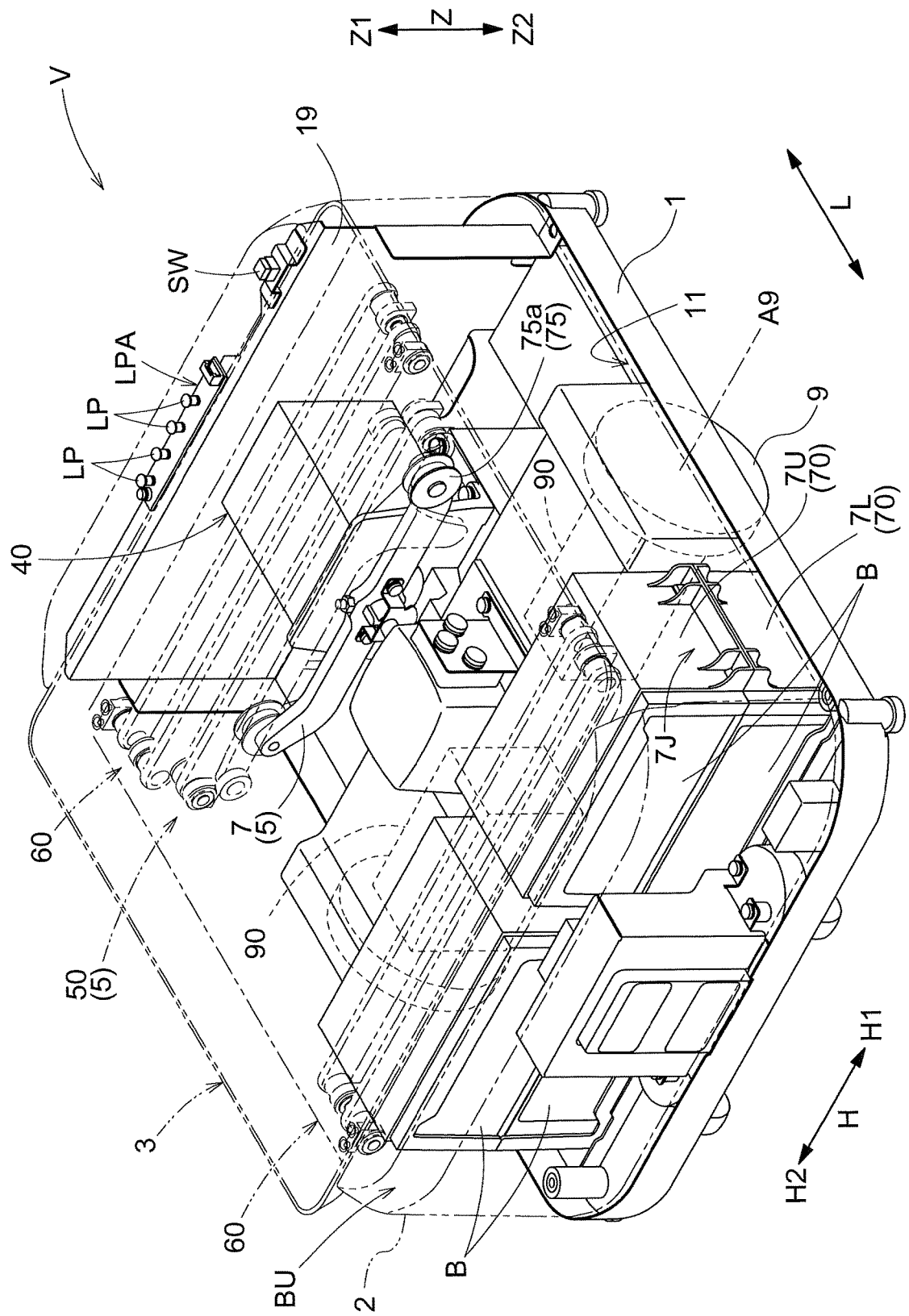
FIG. 16 is a diagram showing an example of a state where a vehicle body cover is removed from a vehicle body frame.
Figure 17:
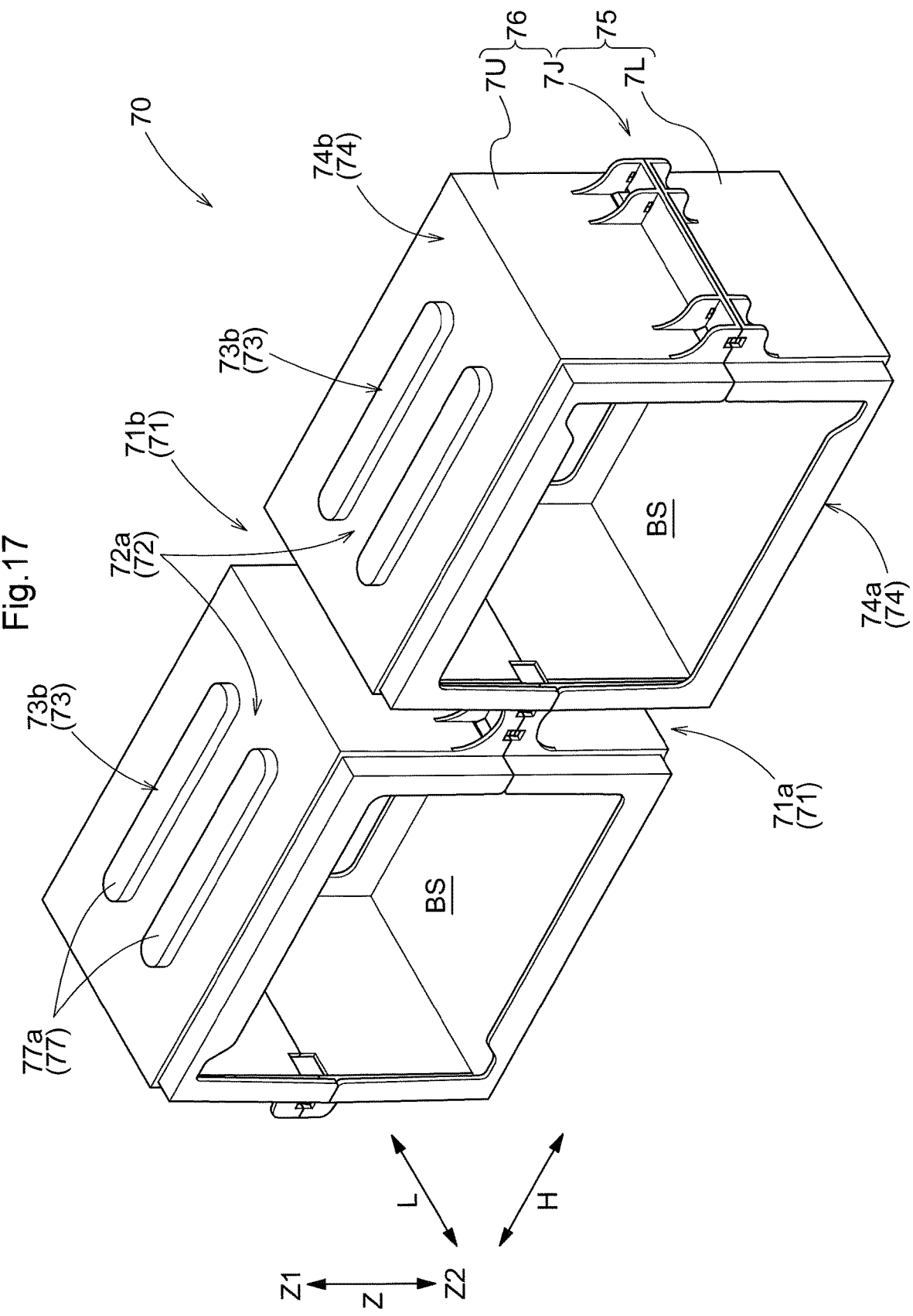
FIG. 17 is a perspective view of a holding member for power storage bodies.

FIG. 16 shows an example of a state where the vehicle body cover 2 is removed from the vehicle body frame 1. In addition to the vehicle body frame 1, the swing arms 50 and the support arms 60 are also shown using imaginary lines to clarify the relationship between the swing arms 50 and the output member 7 and the relationship between the swing arms 50 and the support arms 60. The swing arms 50 are removed from the vehicle body frame 1 together with the vehicle body cover 2, and therefore, the output member 7 is exposed and maintenance of the output member 7 can be easily performed. For example, the pressing rollers 45 can be easily replaced when worn out. Also, in the present embodiment, the transfer drive source 40 is disposed on the lower side Z2 of the support arms 60, but the support arms 60 are removed from the vehicle body frame 1 together with the vehicle body cover 2, and therefore, the transfer drive source 40 is exposed and maintenance of the transfer drive source 40 can be easily performed.

Also, in the present embodiment, the power storage body B is disposed on the lower side Z2 of the support arms 60 as shown in FIG. 16. It is known that the power storage capability of the power storage body B such as a storage battery or a capacitor degrades over time. When the power storage capability has degraded to be lower than or equal to a prescribed level, the power storage body B is replaced. In the present embodiment, the support arms 60 are removed from the vehicle body frame 1 together with the vehicle body cover 2, and therefore, the power storage body B is exposed and can be easily replaced. Moreover, in the present embodiment, the power storage body B is configured as a power storage unit BU that is easily replaceable (can be easily mounted and taken out), although described in detail later.

As shown in FIGS. 6 and 7, the vehicle body cover 2 includes a top surface portion 21 that faces the lower surface 3b of the placement body 3 and covers the wheel drive source 90 and the transfer drive source 40 from the upper side, and a side wall portion 23 that extends from an outer edge portion of the top surface portion 21 toward the lower side. A lower end 23t of the side wall portion 23 is on the lower side Z2 of an upper end 9t of the wheel 9. That is, the side wall portion 23 covers a side surface of the wheel 9. In the state where the vehicle body cover 2 is attached to the vehicle body frame 1, most of the members constituting the article transport vehicle V including a portion of the wheel 9 are covered by the vehicle body cover 2. Therefore, it is possible to appropriately protect the article transport vehicle V from foreign matter including dust, which would otherwise enter the inside of the article transport vehicle V. On the other hand, when it is necessary to perform maintenance of the wheel 9, the wheel drive source 90, the transfer drive source 40, the output member 7, or the like, the vehicle body cover 2 can be easily removed and therefore, the maintenance is facilitated.

Also, the article transport vehicle V is configured to be capable of being stopped when there is an abnormality in the article transport facility F or the individual article transport vehicle V, for example. In the present embodiment, the article transport vehicle V includes a stop switch SW for stopping the wheel drive source 90 and the transfer drive source 40 as shown in FIGS. 7 and 8, for example. The stop switch SW is supported by the vehicle body frame 1, and the vehicle body cover 2 includes a stop switch opening 29 formed at a position corresponding to the stop switch SW.

Also, the article transport vehicle V includes a display lamp LP that serves as an indicator that indicates a state of a section of the article transport vehicle V, such as a driving state of the wheel drive source 90, a driving state of the transfer drive source 40, the position of the placement body 3, and a charge amount of the power storage body B (a storage battery, a capacitor, etc.). The present embodiment includes a plurality of display lamps LP, and a display lamp substrate LPA on which the display lamps LP are mounted is supported by the vehicle body frame 1. The vehicle body cover 2 attached to the vehicle body frame 1 covers the display lamps LP, but the vehicle body cover 2 includes light transmitting sections 28 that are provided at positions corresponding to the display lamps LP and transmit light from the display lamps LP outward from the vehicle body cover 2. Due to the light transmitting sections 28 being provided, it is possible to support the display lamps LP on the vehicle body frame 1 and attach the vehicle body cover 2 to the vehicle body frame 1 in such a manner as to cover the display lamps LP.

The stop switch SW is often electrically connected to the wheel drive source 90 and the transfer drive source 40 or a control device (not shown) for controlling the wheel drive source 90 and the transfer drive source 40 via connecting wires. A control circuit and a power source (both not shown) for the display lamps LP are often supported by the vehicle body frame 1, and the display lamps LP are often connected to the power source via connecting wires. Accordingly, if the stop switch SW and the display lamps LP are supported by the vehicle body cover 2, the vehicle body cover 2 cannot be removed from the vehicle body frame 1 unless the connecting wires are removed. If the stop switch SW and the display lamps LP are supported by the vehicle body frame 1 as in the present embodiment, there is no need to remove the connecting wires when removing the vehicle body cover 2 from the vehicle body frame 1. Also, the vehicle body cover 2 includes the stop switch opening 29, and therefore, the stop switch SW can be easily operated from the outside even if the stop switch SW is supported by the vehicle body frame 1. Also, the vehicle body cover 2 includes the light transmitting sections 28, and therefore, lighting states of the display lamps LP can be easily checked from the outside even if the display lamps LP are supported by the vehicle body frame 1.

Incidentally, the swing arms 50 may wobble when changing their positions from the reference position to the standing position to lift the placement body 3. If the swing arms 50 wobble and consequently the placement body 3 wobbles, an article W supported by the placement body 3 may fall before sliding down to a transfer destination or durability of the swing arms 50 may be reduced. Therefore, in the present embodiment, the opposing surface 2a is provided with guide members 8 for guiding swinging movement of the swing arms 50 as shown in FIGS. 8, 9, and 10, for example.

The guide members 8 are detachably attached to the carriage body 10, and can be replaced easily when worn out due to sliding movement of the swing arms 50 against the guide members 8 or friction between the guide members 8 and the swing arms 50, for example. In the present embodiment, the guide members 8 are fitted into the swing arm housing groove 255 described above. In the present embodiment, each guide member 8 is shaped as a groove that is open on the upper side Z1. As described above, the swing arm housing groove 255 is also shaped as a groove, and the guide members 8 are fixed by being fitted into the swing arm housing groove 255.

As described above, in the present embodiment, the first swing arm 51 and the second swing arm 52 are provided as the swing arms 50. The first swing arm 51 is provided with a first guide member 81 that guides swinging movement of the first swing arm 51, and the second swing arm 52 is provided with a second guide member 82 that guides swinging movement of the second swing arm 52.

In the present embodiment, the support arms 60 are also provided to stably tilt the placement body 3 as described above. The support arms 60 also swing similarly to the swing arms 50, and accordingly, as is the case with the swing arms 50, support guide members 80 for guiding swinging movement of the support arms 60 are provided in the opposing surface 2a.

Similarly to the guide members 8, the support guide members 80 are detachably attached to the carriage body 10. The support guide members 80 can be replaced easily when worn out due to friction between the support guide members 80 and the support arms 60, for example. In the present embodiment, the support guide members 80 are fitted into the support arm housing groove 256 described above. In the present embodiment, each support guide member 80 is shaped as a groove that is open on the upper side Z1 similarly to the guide members 8. As described above, the support arm housing groove 256 is also shaped as a groove, and the support guide members 80 are fixed by being fitted into the support arm housing groove 256.

In the present embodiment, the first support arm 61 and the second support arm 62 are provided as the support arms 60. The first support arm 61 is provided with a first support guide member 83 that guides swinging movement of the first support arm 61, and the second support arm 62 is provided with a second support guide member 84 that guides swinging movement of the second support arm 62.

As described above, in the present embodiment, the power storage body B configured as the power storage unit BU is disposed on the lower side Z2 of the support arms 60. The support arms 60 are removed from the vehicle body frame 1 together with the vehicle body cover 2, and therefore, the power storage unit BU can be easily replaced. Also, the power storage unit BU is configured to be capable of being positioned and mounted in the article transport vehicle V through a simple operation of merely disposing the power storage unit BU at a proper position on the vehicle body frame 1 and attaching the vehicle body cover 2 to the vehicle body frame 1, without using any fastening member such as a bolt. That is, the power storage unit BU in the present embodiment has a structure that makes it possible to appropriately hold the power storage body B in the article transport vehicle V and to easily replace the power storage body B. The following describes details of the configuration of the power storage unit BU with reference to FIGS. 17 to 22 as well.

As shown in FIG. 16, the article transport vehicle V includes the vehicle body frame 1, the wheel 9, the wheel drive source 90, the power storage unit BU, and the vehicle body cover 2. The power storage unit BU includes the power storage body B that supplies power to the wheel drive source 90 and a holding member 70 that holds the power storage body B. The vehicle body cover 2 is attached to the vehicle body frame 1 in such a manner as to cover the wheel drive source 90 and the power storage unit BU.

Figure 18:
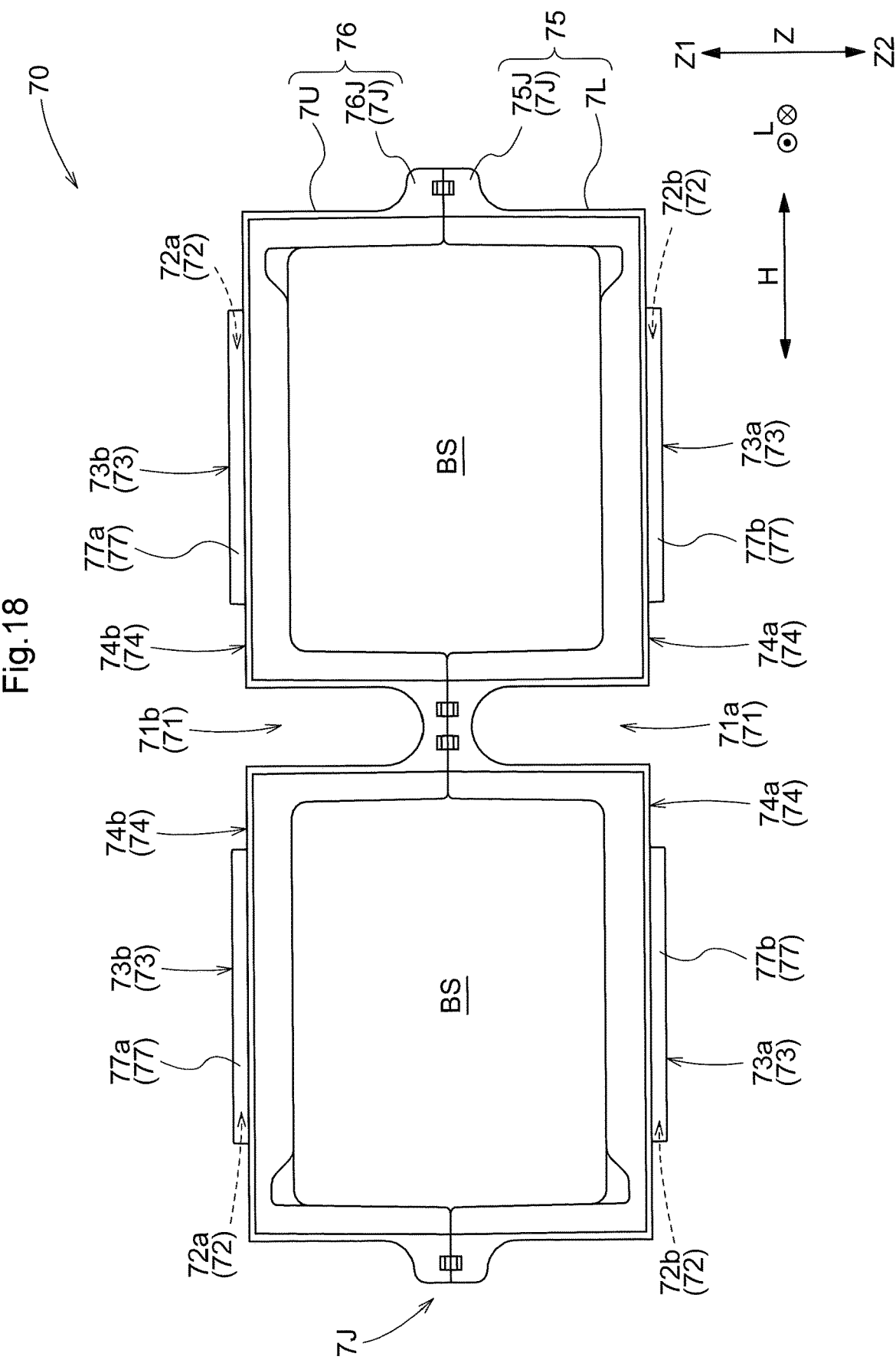
FIG. 18 is a front view of the holding member for power storage bodies.
Figure 19:
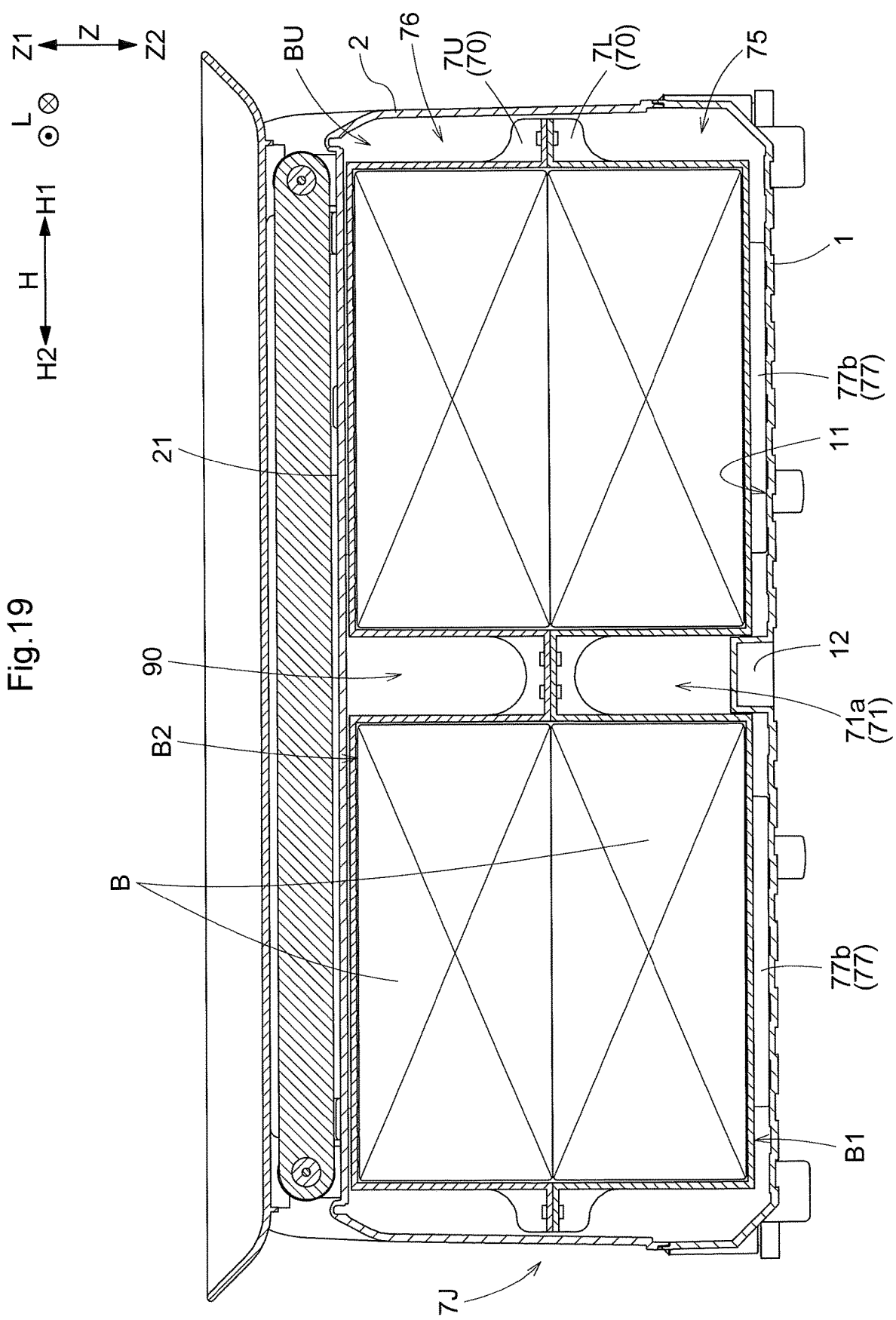
FIG. 19 is a cross-sectional view of the article transport vehicle taken along a plane extending in a vehicle body width direction and showing a portion in which a power storage unit is mounted.
Figure 20:
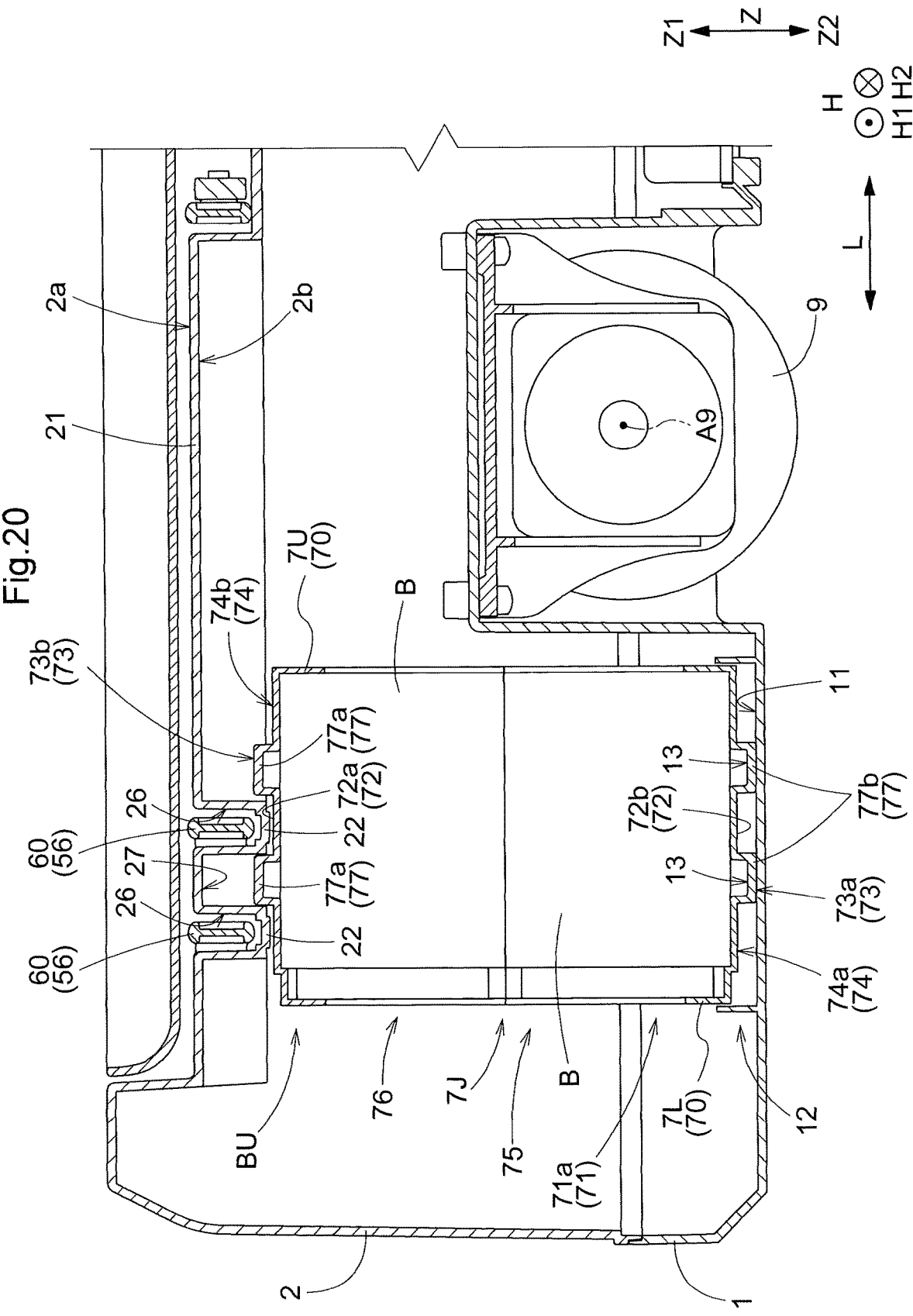
FIG. 20 is an enlarged cross-sectional view of the article transport vehicle taken along a plane extending in an axial direction and showing the portion in which the power storage unit is mounted.

As shown in FIGS. 17 to 20, the holding member 70 includes a lower frame portion 7L covering a lower surface B1 of the power storage body B, an upper frame portion 7U covering an upper surface B2 of the power storage body B, and a joint portion 7J joining the upper frame portion 7U and the lower frame portion 7L. As shown in FIGS. 18 and 20, the lower frame portion 7L includes a first recessed groove portion 71a that is formed in such a manner as to be recessed from a lower end surface 73a of the lower frame portion 7L toward the upper side Z1 and extend along a first direction when viewed in the up-down direction. The first direction corresponds to the axial direction L when the power storage unit BU is mounted in the vehicle. Also, the upper frame portion 7U includes a second recessed groove portion 72a that is formed in such a manner as to be recessed from an upper end surface 73b of the upper frame portion 7U toward the lower side Z2 and extend along a second direction that intersects the first direction when viewed in the up-down direction. In the present embodiment, the second direction corresponds to the vehicle body width direction H. That is, in this example, the first direction and the second direction are orthogonal to each other. However, the first direction and the second direction do not necessarily have to be orthogonal to each other, and are only required to intersect each other.

As shown in FIG. 19, the vehicle body frame 1 includes a bottom surface portion 11 on which the power storage unit BU is placed and a first rib 12 that is formed in such a manner as to protrude from the bottom surface portion 11 toward the upper side Z1 and extend along the axial direction L (the first direction) when viewed in the up-down direction Z. Also, as shown in FIG. 20, the vehicle body cover 2 includes the top surface portion 21 covering the upper side Z1 of the power storage unit BU and a second rib 22 that protrudes from the top surface portion 21 toward the lower side Z2 and extends along the vehicle body width direction H (the second direction) when viewed in the up-down direction.

As shown in FIGS. 19 and 20, the power storage unit BU is sandwiched between the bottom surface portion 11 of the vehicle body frame 1 and the top surface portion 21 of the vehicle body cover 2 in the up-down direction Z while the first recessed groove portion 71a is engaged with the first rib 12 as shown in FIG. 19, and the second recessed groove portion 72a is engaged with the second rib 22 as shown in FIG. 20.

That is, the power storage unit BU is positioned in the vehicle body width direction H (in the present embodiment, a direction orthogonal to the first direction) as a result of the first recessed groove portion 71a and the first rib 12, which are both formed in such a manner as to extend along the axial direction L, being engaged with each other. Also, the power storage unit BU is positioned in the axial direction L (in the present embodiment, a direction orthogonal to the second direction) as a result of the second recessed groove portion 72a and the second rib 22, which are both formed in such a manner as to extend along the vehicle body width direction H, being engaged with each other. That is, the power storage unit BU can be appropriately positioned in each direction extending along the horizontal direction and can be kept from being displaced in the horizontal direction.

Furthermore, the power storage unit BU is sandwiched between the bottom surface portion 11 of the vehicle body frame 1 and the top surface portion 21 of the vehicle body cover 2 in the up-down direction Z. Therefore, the power storage unit BU can be appropriately positioned in the up-down direction Z as well. That is, the power storage unit BU is positioned in the directions substantially corresponding to all axes in a three-dimensional rectangular coordinate system. In the present embodiment, an example is described in which the axial direction L (the first direction), the vehicle body width direction H (the second direction), and the up-down direction Z intersect each other, but the three directions do not necessarily have to be orthogonal to each other as long as the three directions intersect each other.

The power storage unit BU is merely engaged with the vehicle body frame 1 and the vehicle body cover 2 in the up-down direction Z. Accordingly, there is no need to use any fastening member such as a bolt. That is, the power storage unit BU can be positioned through a simple operation of merely disposing the power storage unit BU at a proper position on the vehicle body frame 1 and attaching the vehicle body cover 2 to the vehicle body frame 1. Therefore, it is possible to attach and appropriately position the power storage unit BU relative to the vehicle body frame 1 and the vehicle body cover 2 through the simple operation. That is, according to this configuration, it is possible to realize a structure that makes it possible to appropriately hold the power storage body in the article transport vehicle and to easily replace the power storage body.

Moreover, in the present embodiment, the first rib 12 is a reinforcing rib for securing strength of the vehicle body frame 1. A frame member such as the vehicle body frame 1 including the bottom surface portion 11 spreading in the horizontal direction is often provided with a reinforcing rib to suppress twisting or the like in the horizontal direction and secure strength. When such a reinforcing rib is used to position the power storage unit BU, the structure of the article transport vehicle V is simplified and it is easy to downsize the article transport vehicle V when compared with a case where a dedicated rib for positioning the power storage unit BU is provided.

Also, in the present embodiment, the second rib 22 is formed with use of a portion of a lower surface 2*b* of the top surface portion 21 protruding toward the lower side Z2 in correspondence with recession of the support arm housing groove 256. As described above, the article transport vehicle V includes the transfer device 30, which is a transfer mechanism for transferring articles W. At least a portion of the transfer device 30 is above Z1 the top surface portion 21 of the vehicle body cover 2, and the transfer device 30 includes swing members that swing when transferring an article. As described above, the support arms 60 correspond to such swing members, and the support arm housing groove 256 for housing the support arms 60 serving as the swing members is formed in the upper surface of the top surface portion 21. That is, it is possible to position the power storage unit BU with use of the shape of the top surface portion 21 of the vehicle body cover 2 forming the support arm housing groove 256 for housing the support arms 60. Accordingly, the structure of the article transport vehicle V is simplified and it is easy to downsize the article transport vehicle V when compared with a case where a dedicated rib for positioning the power storage unit BU is provided.

Here, an example is described in which the second rib 22 is formed with use of the portion of the lower surface 2*b* of the top surface portion 21 protruding toward the lower side Z2 in correspondence with recession of the support arm housing groove 256, but the second rib 22 may also be formed with use of a portion of the lower surface 2*b* of the top surface portion 21 protruding toward the lower side Z2 in correspondence with recession for the swing arms 50. Specifically, the second rib 22 may also be formed with use of a portion of the lower surface 2*b* of the top surface portion 21 protruding toward the lower side Z2 in correspondence with recession of the swing arm housing groove 255 (a housing groove) for housing the swing arms 50 serving as swing members. However, it is difficult to secure a space for disposing the power storage unit BU on the lower side Z2 of the swing arms 50 because the transfer drive mechanism 4 of the transfer device 30, such as the output member 7 is disposed. Accordingly, the second rib 22 is preferably formed with use of recession of the support arm housing groove 256 as in the present embodiment.

Figure 22:
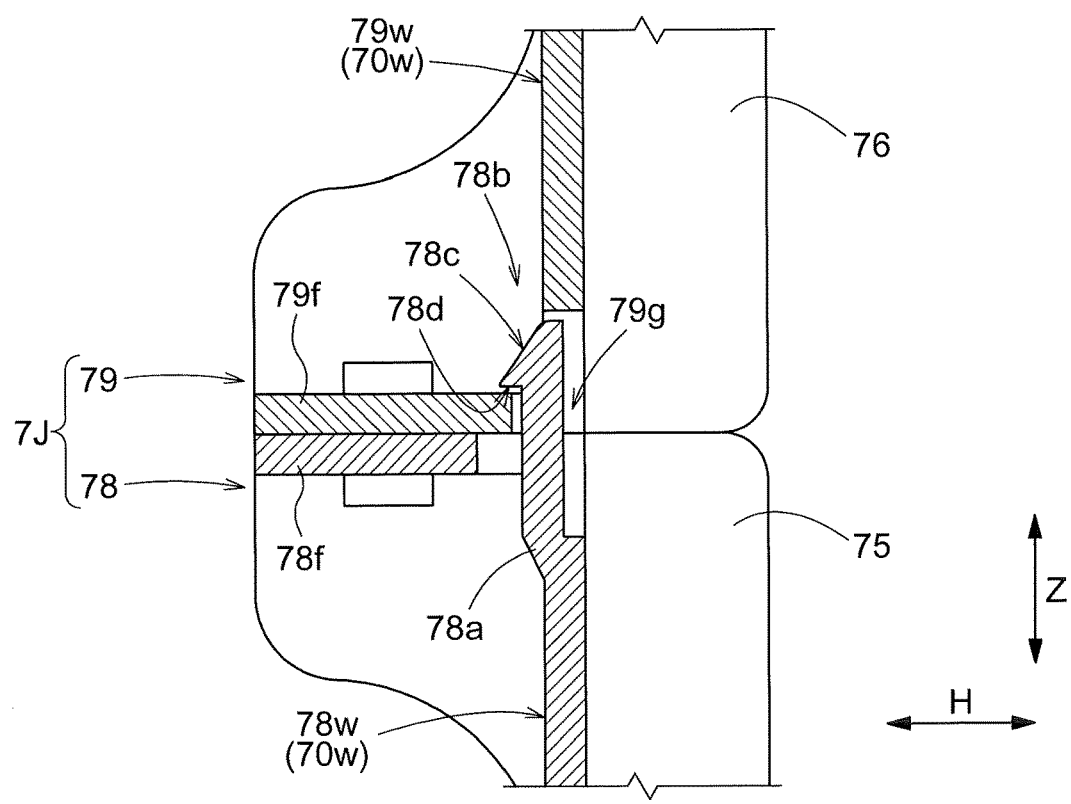
FIG. 22 is an enlarged cross-sectional view of the joint portion of the holding member.

As shown in FIGS. 17 to 20, the holding member 70 is configured by coupling a lower frame 75 that includes the lower frame portion 7L and a portion of the joint portion 7J (a lower frame-side joint portion 75J) and an upper frame 76 that includes the upper frame portion 7U and a portion of the joint portion 7J (an upper frame-side joint portion 76J). As shown in FIGS. 21 and 22, the lower frame-side joint portion 75J, which is the joint portion 7J of the lower frame 75, and the upper frame-side joint portion 76J, which is the joint portion 7J of the upper frame 76, include joint portions 7J to be coupled to each other. The lower frame-side joint portion 75J and the upper frame-side joint portion 76J each include a male joint portion 78 and a female joint portion 79, and are coupled to each other by engaging the male joint portion 78 of the lower frame-side joint portion 75J with the female joint portion 79 of the upper frame-side joint portion 76J and engaging the female joint portion 79 of the lower frame-side joint portion 75J with the male joint portion 78 of the upper frame-side joint portion 76J. The male joint portion 78 and the female joint portion 79 correspond to frame coupling mechanisms that are coupling mechanisms for coupling the joint portion 7J (the lower frame-side joint portion 75J) of the lower frame 75 and the joint portion 7J (the upper frame-side joint portion 76J) of the upper frame 76. Although described in detail later, the lower frame 75 and the upper frame 76 including the first recessed groove portion 71*a* and the second recessed groove portion 72*a* described above have the same shape.

As shown in FIGS. 21 and 22, the male joint portion 78 includes a claw main body portion 78*a*, a claw distal end portion 78*b*, a claw slope portion 78*c*, a barb portion 78*d*, a male-side contact portion 78*f*, and a male-side side wall portion 78*w* (a frame side wall portion 70*w*). Also, the female joint portion 79 includes a female-side contact portion 79*f*, a female-side engaging portion 79*g*, and a female-side side wall portion 79*w* (a frame side wall portion 70*w*). The claw main body portion 78*a* of the male joint portion 78 is formed in such a manner as to protrude from the male-side side wall portion 78*w* and extend along the up-down direction Z toward the female joint portion 79. Thus, a space is formed between the claw main body portion 78*a* and a line extending along the up-down direction Z from the male-side side wall portion 78*w*, and the claw main body portion 78*a* is formed in such a manner as to be elastic in the vehicle body width direction H. The claw slope portion 78*c* is formed between the claw main body portion 78*a* and the claw distal end portion 78*b* in such a manner that the width of the claw slope portion 78*c* in the vehicle body width direction H decreases toward the claw distal end portion 78*b*. The barb portion 78*d* is formed between the claw slope portion 78*c* and the claw main body portion 78*a*. The female-side engaging portion 79*g* is formed in the female joint portion 79 by cutting off a portion of the female-side side wall portion 79*w* along the up-down direction Z and cutting off a portion of the female-side contact portion 79*f* along the vehicle body width direction H from the female-side side wall portion 79*w*.

While the claw main body portion 78*a* of the male joint portion 78 is elastically deformed toward the frame side wall portion 70*w* in the vehicle body width direction H, the claw distal end portion 78*b* moves in the up-down direction Z past the male-side contact portion 78*f* and passes through the female-side engaging portion 79*g* while being guided by the claw slope portion 78*c*. The male-side contact portion 78*f* comes into contact with the female-side contact portion 79*f*, and the barb portion 78*d* is engaged with the female-side contact portion 79*f*, and thus the male joint portion 78 and the female joint portion 79 are coupled to each other. As shown in FIG. 21, both of the lower frame 75 and the upper frame 76 include the male joint portion 78 and the female joint portion 79. That is, the frame bodies are configured such that even when the lower frame 75 and the upper frame 76 are interchanged, a frame that is on the lower side in the up-down direction Z serves as the lower frame 75, and a frame that is on the upper side in the up-down direction Z serves as the upper frame 76.

That is, the lower frame 75 and the upper frame 76 including the first recessed groove portion 71*a* and the second recessed groove portion 72*a* described above have the same shape so that the lower frame 75 and the upper frame 76 function even when interchanged. In the above description, the first recessed groove portion 71*a* is described as being formed in the lower frame portion 7L (the lower frame 75) with reference to FIGS. 17 and 18, for example. However, a recessed groove portion (an upper frame-side first recessed groove portion 71*b*) that can serve as the first recessed groove portion 71*a* is formed in the upper frame portion 7U (the upper frame 76) as well. The first recessed groove portion 71*a* can also be said to be a lower frame-side first recessed groove portion, and the first recessed groove portion 71*a* (the lower frame-side first recessed groove portion) and the upper frame-side first recessed groove portion 71b can be collectively referred to as first direction recessed groove portions 71.

As described above, the first recessed groove portion 71a (the lower frame-side first recessed groove portion) is formed in such a manner as to be recessed from the lower end surface 73a of the lower frame portion 7L toward the upper side Z1 and extend along the axial direction L (the first direction) when viewed in the up-down direction. The upper frame-side first recessed groove portion 71b is formed in such a manner as to be recessed from the upper end surface 73b of the upper frame portion 7U toward the lower side Z2 and extend along the axial direction L (the first direction) when viewed in the up-down direction. When the lower end surface 73a of the lower frame portion 7L and the upper end surface 73b of the upper frame portion 7U are collectively referred to as up-down direction end surfaces 73, it can be said that the first direction recessed groove portions 71 are formed in such a manner as to be recessed from the up-down direction end surfaces 73 toward a power storage body housing space BS along the up-down direction Z and extend along the axial direction L (the first direction) when viewed in the up-down direction.

Similar can be said for the second recessed groove portion 72a. In the above description, the second recessed groove portion 72a is described as being formed in the upper frame portion 7U (the upper frame 76) with reference to FIGS. 17 and 20, for example. However, a recessed groove portion (a lower frame-side second recessed groove portion 72b) that can serve as the second recessed groove portion 72a is formed in the lower frame portion 7L (the lower frame 75) as well. The second recessed groove portion 72a can also be said to be an upper frame-side second recessed groove portion, and the second recessed groove portion 72a (the upper frame-side second recessed groove portion) and the lower frame-side second recessed groove portion 72b can be collectively referred to as second direction recessed groove portions 72.

As described above, the second recessed groove portion 72a (the upper frame-side second recessed groove portion) is formed in such a manner as to be recessed from the upper end surface 73b of the upper frame portion 7U toward the lower side Z2 and extend along the vehicle body width direction H (the second direction) when viewed in the up-down direction. The lower frame-side second recessed groove portion 72b is formed in such a manner as to be recessed from the lower end surface 73a of the lower frame portion 7L toward the upper side Z1 and extend along the vehicle body width direction H (the second direction) when viewed in the up-down direction. It can be said that the second direction recessed groove portions 72 are formed in such a manner as to be recessed from the up-down direction end surfaces 73 toward the power storage body housing space BS along the up-down direction Z and extend along the vehicle body width direction H (the second direction) when viewed in the up-down direction.

When the lower frame 75 and the upper frame 76 have the same shape as described above, the second direction recessed groove portion 72 (the lower frame-side second recessed groove portion 72b) is also formed in the lower frame portion 7L (the lower frame 75), and the first direction recessed groove portion 71 (the upper frame-side first recessed groove portion 71b) is also formed in the upper frame portion 7U (the upper frame 76). Accordingly, a protrusion that can engage with the second direction recessed groove portion 72 (the lower frame-side second recessed groove portion 72b) may be formed on the bottom surface portion 11 of the vehicle body frame 1. Likewise, a protrusion that can engage with the first direction recessed groove portion 71 (the upper frame-side first recessed groove portion 71b) may be formed on the top surface portion 21 of the vehicle body cover 2.

It can also be said that the second direction recessed groove portion 72 is formed between two protrusions, rather than being formed by a recess. For example, when an outer wall surface in the up-down direction Z of a main body of a housing constituting the lower frame 75 and the upper frame 76 is referred to as an up-down direction reference surface 74, it can be said that the second direction recessed groove portion 72 is formed between two protrusions 77 that are formed in such a manner as to protrude from the up-down direction reference surface 74 toward the side opposite to the power storage body housing space BS along the up-down direction Z and extend along the vehicle body width direction H (the second direction) when viewed in the up-down direction. When such protrusions 77 are considered in a manner similar to the upper end surface 73b of the upper frame portion 7U, the lower end surface 73a of the lower frame portion 7L, the second recessed groove portion 72a (the upper frame-side second recessed groove portion), and the lower frame-side second recessed groove portion 72b, the up-down direction reference surface 74 of the upper frame 76 can be referred to as an upper frame-side up-down direction reference surface 74a, the up-down direction reference surface 74 of the lower frame 75 can be referred to as a lower frame-side up-down direction reference surface 74b, the protrusions 77 on the upper frame 76 can be referred to as upper frame-side protrusions 77a, and the protrusions 77 on the lower frame 75 can be referred to as lower frame-side protrusions 77b.

As described above, even when the lower frame 75 and the upper frame 76 are interchanged, one frame that is on the upper side Z1 in the up-down direction Z relative to the other frame can serve as the upper frame 76, and the other frame that is on the lower side Z2 relative to the one frame can serve as the lower frame 75. If the lower frame 75 and the upper frame 76 have the same shape as described above, the number of types of components of the article transport vehicle V can be reduced and it is easy to reduce the cost of the article transport vehicle V. Also, it is possible to sandwich the power storage body B in the up-down direction and appropriately hold the power storage body B by merely coupling the lower frame 75 and the upper frame 76 at the joint portion 7J. Naturally, the lower frame 75 and the upper frame 76 need not be distinguished from each other at this time. Therefore, the holding member 70 can be easily attached to the power storage body B.

As shown in FIGS. 16 and 19, for example, the power storage unit BU includes a plurality of power storage bodies B (in the present embodiment, four power storage bodies B). The holding member 70 is configured to hold the plurality of power storage bodies B together. That is, the holding member 70 houses and holds the plurality of power storage goodies B together in the power storage body housing space BS. By combining a plurality of power storage bodies B, it is possible to configure power storage units BU having various capacities according to various types of transport vehicles including the article transport vehicle V of the present embodiment, for example. When the same power storage bodies B are used, procurement costs of individual power storage bodies B can be reduced, and accordingly, it is preferable that the power storage unit BU of the present embodiment is constituted by a plurality of power storage bodies B. As shown in FIG. 19, in the present embodiment, the power storage unit BU includes four power storage bodies B, and two power storage bodies B are disposed on each of two sides of the first recessed groove portion 71a in the vehicle body width direction H. Sometimes, it is preferable to provide a space between adjacent power storage bodies B in view of insulation and heat dissipation. When such a space is used as the first recessed groove portion 71a, the power storage unit BU can be downsized.

Also, the power storage bodies B are relatively heavy members, and a weight balance may be impaired depending on positions at which the power storage bodies B are mounted on the article transport vehicle V. In addition to the power storage bodies B and the power storage unit BU, the transfer drive source 40 and the wheel drive source 90 are heavy members in the article transport vehicle V. As shown in FIG. 16, the wheel drive source 90 overlaps a rotation axis A9 of the wheel 9 when viewed in the up-down direction, and a weight balance is maintained with respect to the rotation axis A9. Accordingly, in the present embodiment, the transfer drive source 40 for driving a swing member (the output member 7) that swings when transferring an article W and the power storage unit BU are separated on two sides of the rotation axis A9 of the wheel 9 in a direction (in this example, the axial direction L) orthogonal to the rotation axis A9 when viewed in the up-down direction. That is, the transfer drive source 40 and the power storage unit BU are disposed in such a manner as to maintain a weight balance with respect to the rotation axis A9 to suppress unevenness of the weight distribution of the whole article transport vehicle V.

The output member 7 that is directly driven by the transfer drive source 40 is described as an example of swing members that swing when transferring an article W, but the swing arms 50, the support arms 60, and the placement body 3 also swing as described above. Therefore, the swing members may also include the swing arms 50, the support arms 60, and the placement body 3. The transfer drive source 40 is only required to drive at least one swing member of the transfer mechanism including swing members that swing when transferring an article W.

As described above, according to the present embodiment, it is possible to realize a structure that makes it possible to appropriately hold the power storage body B in the article transport vehicle V and to easily replace the power storage body B.

The following describes other embodiments. Configurations of the following embodiments are not only applicable individually but also applicable in combination with configurations of other embodiments as long as no contradiction arises.

(1) In the above embodiment, an example is described in which the first rib 12 is a reinforcing rib of the vehicle body frame 1. However, the first rib 12 may be formed separately from a reinforcing rib of the vehicle body frame 1.

(2) In the above embodiment, an example is described in which the second rib 22 is formed with use of the portion of the lower surface 2b of the top surface portion 21 protruding toward the lower side Z2 in correspondence with recession of the support arm housing groove 256 (a housing groove) for housing the support arms 60 (swing members). However, even in a case where a recessed groove portion 25 such as the support arm housing groove 256 or the swing arm housing groove 255 is formed in the top surface portion 21, the second rib 22 may be formed separately from the portion protruding toward the lower side Z2 in correspondence with recession of the recessed groove portion 25.

(3) In the above embodiment, an example is described in which the upper frame and the lower frame have the same shape. However, this does not exclude a configuration in which the upper frame and the lower frame have different shapes.

(4) In the above embodiment, an example is described in which the power storage unit BU includes a plurality of power storage bodies B, but a configuration is also possible in which the power storage unit BU includes a single power storage body B. Also, in the case where the power storage unit BU includes a plurality of power storage bodies B, the number of power storage bodies B may be two or six, for example, rather than four as in the example described above. Also, in the case where the power storage unit BU includes a plurality of power storage bodies B, a configuration is also possible in which the first recessed groove portion 71a is not formed between adjacent power storage bodies B.

(5) In the above embodiment, an example is described in which the transfer drive source 40 and the power storage unit BU are separated on two sides of the rotation axis A9 of the wheel 9 when viewed in the up-down direction (in a plan view). However, this does not exclude a configuration in which the transfer drive source 40 and the power storage unit BU are both disposed on one side in the direction orthogonal to the rotation axis A9 of the wheel 9 when viewed in the up-down direction. For example, a configuration is also possible in which a heavy member other than the transfer drive source 40 and the power storage unit BU is disposed on one side in the direction orthogonal to the rotation axis A9 of the wheel 9, and the transfer drive source 40 and the power storage unit BU are disposed on the other side in the direction orthogonal to the rotation axis A9 of the wheel 9.

The following briefly describes a summary of the article transport vehicle described above.

In an aspect, an article transport vehicle configured to transport an article includes: a vehicle body frame, a wheel supported in such a manner as to be rotatable relative to the vehicle body frame; a wheel drive source configured to drive the wheel; a power storage unit including a power storage body configured to supply power to the wheel drive source and a holding member configured to hold the power storage body; and a vehicle body cover attached to the vehicle body frame and covering the wheel drive source and the power storage unit, wherein the vehicle body frame includes: a bottom surface portion on which the power storage unit is placed; and a first rib protruding from the bottom surface portion toward an upper side and extending along a first direction when viewed in an up-down direction, the vehicle body cover includes: a top surface portion covering the power storage unit from the upper side; and a second rib protruding from the top surface portion toward a lower side and extending along a second direction that intersects the first direction when viewed in the up-down direction, the holding member includes: a lower frame portion covering a lower surface of the power storage body; an upper frame portion covering an upper surface of the power storage body; and a joint portion joining the upper frame portion and the lower frame portion, the lower frame portion includes a first recessed groove portion recessed from a lower end surface of the lower frame portion toward the upper side and extending along the first direction when viewed in the up-down direction, the upper frame portion includes a second recessed groove portion recessed from an upper end surface of the upper frame portion toward the lower side and extending along the second direction when viewed in the up-down direction, and the power storage unit is sandwiched between the bottom surface portion of the vehicle body frame and the top surface portion of the vehicle body cover in the up-down direction while the first recessed groove portion is engaged with the first rib and the second recessed groove portion is engaged with the second rib.

According to this configuration, the first recessed groove portion and the first rib extend along the first direction, and it is possible to position the power storage unit in a direction orthogonal to the first direction by engaging the first recessed groove portion and the first rib. Also, the second recessed groove portion and the second rib extend along the second direction, and it is possible to position the power storage unit in a direction orthogonal to the second direction by engaging the second recessed groove portion and the second rib. The first direction and the second direction intersect each other, and accordingly, the power storage unit can be appropriately positioned in each direction extending along the horizontal direction and can be kept from being displaced. Furthermore, the power storage unit is sandwiched between the bottom surface portion of the vehicle body frame and the top surface portion of the vehicle body cover in the up-down direction, and therefore can be appropriately positioned in the up-down direction as well. That is, the power storage unit is positioned in the directions substantially corresponding to all axes of a three-dimensional rectangular coordinate system (the three directions do not necessarily have to be orthogonal to each other as long as the three directions intersect each other). These configurations are merely engaged with each other in the up-down direction, and accordingly, there is no need to use a fastening member such as a bolt, and the power storage unit can be positioned through a simple operation of merely disposing the power storage unit at a proper position on the vehicle body frame and attaching the vehicle body cover to the vehicle body frame. Therefore, it is possible to attach and appropriately position the power storage unit relative to the vehicle body frame and the vehicle body cover through the simple operation. That is, according to this configuration, it is possible to realize a structure that makes it possible to appropriately hold the power storage body in the article transport vehicle and to easily replace the power storage body.

Here, it is preferable that the first rib is a reinforcing rib of the vehicle body frame.

According to this configuration, the power storage unit can be positioned with use of a reinforcing rib, which is preferably provided to secure strength of the vehicle body frame. Accordingly, the structure of the article transport vehicle is simplified and it is easy to downsize the article transport vehicle when compared with a case where a dedicated rib for positioning the power storage unit is provided.

It is preferable that the article transport vehicle further includes a transfer mechanism configured to transfer the article, wherein the transfer mechanism includes a swing member that is above the top surface portion and configured to swing when transferring the article, the top surface portion has an upper surface including a housing groove in which the swing member is housable, and the second rib is formed with use of a portion of a lower surface of the top surface portion protruding toward the lower side in correspondence with recession of the housing groove.

According to this configuration, the power storage unit can be positioned with use of the shape of the top surface portion of the vehicle body cover forming the housing groove for housing the swing member of the transfer mechanism. Accordingly, the structure of the article transport vehicle is simplified and it is easy to downsize the article transport vehicle when compared with a case where a dedicated rib for positioning the power storage unit is provided.

It is preferable that the holding member is configured by coupling a lower frame that includes the lower frame portion and a portion of the joint portion to an upper frame that includes the upper frame portion and a portion of the joint portion, the joint portion of the lower frame and the joint portion of the upper frame each include a frame coupling mechanism configured to couple the lower frame and the upper frame, and the lower frame and the upper frame have shapes corresponding to each other.

When the lower frame and the upper frame have the same shape, the number of types of components of the article transport vehicle can be reduced and it is easy to reduce the cost of the article transport vehicle. Also, it is possible to sandwich the power storage body in the up-down direction and appropriately hold the power storage body by merely coupling the lower frame and the upper frame with use of the frame coupling mechanism. At this time, the lower frame and the upper frame need not be distinguished from each other. Therefore, the holding member can be easily attached to the power storage body.

It is preferable that the power storage unit includes a plurality of the power storage bodies, the holding member is configured to hold the plurality of power storage bodies together, and the plurality of power storage bodies are separated on two sides of the first recessed groove portion in the second direction.

According to this configuration, the first recessed groove portion can be formed with use of a space between the plurality of power storage bodies. Therefore, it is easy to downsize the power storage unit.

It is preferable that the article transport vehicle further includes: a transfer mechanism including a plurality of swing members configured to swing when transferring the article; and a transfer drive source configured to drive at least one swing member among the swing members, wherein the transfer drive source and the power storage unit are separated on two sides of a rotation axis of the wheel in a direction orthogonal to the rotation axis when viewed in the up-down direction.

According to this configuration, heavy members such as the transfer drive source and the power storage unit are disposed on two sides of the rotation axis of the wheel, and therefore, it is easy to suppress unevenness of the weight distribution of the whole article transport vehicle.

What is claimed is:

1. An article transport vehicle configured to transport an article, comprising:
   a vehicle body frame;
   a wheel supported in such a manner as to be rotatable relative to the vehicle body frame;
   a wheel drive source configured to drive the wheel;
   a power storage unit comprising a power storage body configured to supply power to the wheel drive source and a holding member configured to hold the power storage body; and
   a vehicle body cover attached to the vehicle body frame and covering the wheel drive source and the power storage unit, wherein the vehicle body frame comprises:
- a bottom surface portion on which the power storage unit is placed; and
- a first rib protruding from the bottom surface portion toward an upper side and extending along a first direction when viewed in an up-down direction, the vehicle body cover comprises:
- a top surface portion covering the power storage unit from the upper side; and
- a second rib protruding from the top surface portion toward a lower side and extending along a second direction that intersects the first direction when viewed in the up-down direction, the holding member comprises:
- a lower frame portion covering a lower surface of the power storage body;
- an upper frame portion covering an upper surface of the power storage body; and
- a joint portion joining the upper frame portion and the lower frame portion, the lower frame portion includes a first recessed groove portion recessed from a lower end surface of the lower frame portion toward the upper side and extending along the first direction when viewed in the up-down direction, the upper frame portion includes a second recessed groove portion recessed from an upper end surface of the upper frame portion toward the lower side and extending along the second direction when viewed in the up-down direction, and the power storage unit is sandwiched between the bottom surface portion of the vehicle body frame and the top surface portion of the vehicle body cover in the up-down direction while the first recessed groove portion is engaged with the first rib and the second recessed groove portion is engaged with the second rib.

2. The article transport vehicle according to claim 1, wherein the first rib is a reinforcing rib of the vehicle body frame.

3. The article transport vehicle according to claim 1, further comprising:
a transfer mechanism configured to transfer the article, wherein:
- the transfer mechanism comprises a swing member that is above the top surface portion and configured to swing when transferring the article,
- the top surface portion has an upper surface including a housing groove in which the swing member is housable, and
- the second rib is formed with use of a portion of a lower surface of the top surface portion protruding toward the lower side in correspondence with recession of the housing groove.

4. The article transport vehicle according to claim 1, wherein:
- the holding member is configured by coupling a lower frame that includes the lower frame portion and a portion of the joint portion to an upper frame that includes the upper frame portion and a portion of the joint portion,
- the joint portion of the lower frame and the joint portion of the upper frame each comprise a frame coupling mechanism configured to couple the lower frame and the upper frame, and
- the lower frame and the upper frame have shapes corresponding to each other.

5. The article transport vehicle according to claim 1, wherein:
- the power storage unit comprises a plurality of the power storage bodies,
- the holding member is configured to hold the plurality of power storage bodies together, and
- the plurality of power storage bodies are separated on two sides of the first recessed groove portion in the second direction.

6. The article transport vehicle according to claim 1, further comprising:
- a transfer mechanism comprising a plurality of swing members configured to swing when transferring the article; and
- a transfer drive source configured to drive at least one swing member among the swing members, and
wherein the transfer drive source and the power storage unit are separated on two sides of a rotation axis of the wheel in a direction orthogonal to the rotation axis when viewed in the up-down direction.

* * * * *